(12) United States Patent
Camera et al.

(10) Patent No.: US 11,082,508 B2
(45) Date of Patent: Aug. 3, 2021

(54) DEVICES, SYSTEMS, AND METHODS FOR TRACKING DIGITAL READING BEHAVIOR OF USERS

(71) Applicant: reallyread.it, inc., Toms River, NJ (US)

(72) Inventors: Jeffrey A. Camera, Toms River, NJ (US); William F. Loundy, New York City, NY (US)

(73) Assignee: reallyread.it, inc., Toms River, NJ (US)

( * ) Notice: Subject to any disclaimer, the term of this patent is extended or adjusted under 35 U.S.C. 154(b) by 77 days.

(21) Appl. No.: 16/424,390

(22) Filed: May 28, 2019

(65) Prior Publication Data

US 2019/0364118 A1  Nov. 28, 2019

Related U.S. Application Data

(60) Provisional application No. 62/677,060, filed on May 27, 2018, provisional application No. 62/678,985, filed on May 31, 2018.

(51) Int. Cl.
*G06F 15/16* (2006.01)
*H04L 29/08* (2006.01)
*G06F 40/279* (2020.01)

(52) U.S. Cl.
CPC .......... *H04L 67/22* (2013.01); *G06F 40/279* (2020.01); *H04L 67/02* (2013.01)

(58) Field of Classification Search
CPC ....... G06F 40/10; G06F 40/279; H04L 67/02; H04L 67/22; H04L 67/306
See application file for complete search history.

(56) References Cited

U.S. PATENT DOCUMENTS

| | | | |
|---|---|---|---|
| 9,407,711 B2 | 8/2016 | Bayen et al. | |
| 2012/0324355 A1* | 12/2012 | Mbenkum | G06F 3/167 715/727 |
| 2015/0142954 A1 | 5/2015 | Bayen et al. | |
| 2016/0088101 A1* | 3/2016 | Batiste | H04L 67/22 709/224 |
| 2016/0381157 A1* | 12/2016 | Magnusson | H04L 67/22 709/203 |

* cited by examiner

*Primary Examiner* — Normin Abedin
(74) *Attorney, Agent, or Firm* — Willink & Hunt LLP; Marcus T. Hunt

(57) ABSTRACT

Methods, systems, and computer-readable media are provided that cause a system to generate read states for virtual lines tracked and displayed within a viewport for reading content read by a user. The position of, and number of words assigned to, the virtual lines can be calculated. The read states can be based on: a duration of time that each of the virtual lines remains in the viewport, and the number of words assigned to each of the virtual lines. The duration of time is determined by a counter. Methods, systems, and computer-readable media are provided that cause a computer system to receive one or more read states; determine a reading status of a user with respect to reading content; and, enabling one or more user privileges related to the reading content for the user as a result of a determination that the user has read at least a predetermined threshold amount.

25 Claims, 10 Drawing Sheets

DEVICES, SYSTEMS, AND METHODS FOR TRACKING DIGITAL READING BEHAVIOR OF USERS

CROSS-REFERENCE TO RELATED APPLICATIONS

This application claims benefit under 35 U.S.C. § 119(e) of U.S. Provisional Application No. 62/677,060, filed May 27, 2018, and U.S. Provisional Application No. 62/678,985, filed May 31, 2018, the entireties of which are both incorporated herein by reference.

FIELD

The present technology described herein relates generally to tracking user behavior of digital reading content. More particularly, the present technology relates to tracking user-reading of digital reading content and providing content delivery services to the users based thereon.

BACKGROUND

Digital reading content is ubiquitous on the Internet. Digital reading content can be found on various websites containing a plethora of reading content, such as blogs, news articles, articles from professional journals, stories, poems, etc. Many of these websites enable users to freely post comments about the reading content, often in a comments section following the reading content. In some cases, the online content provider may require users to have an account with the website before being able to comment on the reading content. For example, Yahoo™ may require users to have a yahoo account and sign in before allowing the user to comment on a news article shown on its website— www.yahoo.com. Other than requiring an account, content providers typically provide little to no barrier for commenting on the reading content provided on their websites. Many users provide comments without having fully read the reading content, or in many cases, without having read any of the reading content except the title of the article. Some users simply comment on the comments without having read the article, in some cases with the sole intention of antagonizing (or "trolling") other commenters. In some instances, comments may be spam, advertisements, or click bait that was posted by various individuals, companies, or bots. Such a free ability to provide comments can degrade the quality of discussion regarding the actual reading content that the comments were designed for. It can undermine the ability to have meaningful and thoughtful discussion.

Some content providers, such as Reddit™, provide online users with a list of reading content on their website. The list of reading content is often ranked according to how many comments an article has, or how many "likes" or "thumbs up" an article has, which do not require the user to have actually read the reading content. As a result, reading content is not being ranked according to the number of users that have read the reading content.

SUMMARY

In certain aspects of the present disclosure, computer-implemented methods, systems, and computer-readable media are provided that cause a computer system to perform: receiving one or more read states from a user device; determining a reading status of the user with respect to the reading content; determining that the user has read at least a predetermined threshold amount of the reading content based on the determined reading status; enabling one or more user privileges related to the reading content for the user as a result of the determination that the user has read at least the predetermined threshold amount; and transmitting user-specific data integrated within one or more web pages for display on the user device for the user. The one or more read states include an array of values representing numbers of read and unread words for reading content that is viewed on the user device by a user. The reading status can be determined based on the one or more read states. The user-specific data includes the enabled one or more user privileges for the user.

In one embodiment, the one or more read states includes one or more summation read states, and the reading status can be determined based on the one or more summation read states.

In one embodiment, the one or more summation read states can be arrays of alternating signed non-zero integers representing alternating numbers of read words and unread words.

In one embodiment, the computer system further performs transmitting data for a collection of users integrated within the one or more web pages for display on the user device for the user. The data for the collection of users includes a popularity ranking of a plurality of reading content. The popularity of each of the reading content in the plurality of reading content can be based on the number of users of the collection that have read at least a predetermined threshold amount.

In one embodiment, the one or more read states includes one or more summation read states. The reading status can be determined based on the one or more summation read states. The one or more summation read states can be arrays of alternating signed non-zero integers representing alternating numbers of read words and unread words.

In one embodiment, the one or more user privileges includes commenting on the reading comment, and the predetermined threshold amount is 100% of the reading content.

In one embodiment, the predetermined threshold amount is 100% of the reading content.

In one embodiment, the system includes: a server that includes the at least one first process and the first memory; and a user device communicatively coupled to the server. The user device includes: at least one second processor; and a second memory storing second instructions that, when executed by the at least one second processor, cause the system to perform: receiving an indication that the user accessed a second web page with the user device; scanning the web page to determine that the second web page includes the reading content for users to read; analyzing a DOM structure of the web page to identify the primary text of the reading content; calculating a position for each of a plurality of virtual lines for the primary text relative to a viewport of the user device; calculating a number of words assigned to each of the plurality of virtual lines; tracking which virtual lines of the plurality of virtual lines can be displayed within the viewport of the user device; initiating a counter for the virtual lines displayed within the viewport of the user device; and generating the read states for each of the virtual lines displayed within the viewport. The read states can be based on: a duration of time that each of the virtual lines displayed within the viewport remains in the viewport, wherein the duration of time can be determined by the counter; and the number of words assigned to each of the virtual lines displayed within the viewport.

In certain aspects of the present disclosure, computer-implemented methods, systems, and computer-readable media can be provided that cause a computer system to perform: receiving an indication that a user accessed a web page with a user device; scanning the web page to determine that the web page includes reading content for users to read; analyzing a DOM structure of the web page to identify the primary text of the reading content; calculating a position for each of a plurality of virtual lines for the primary text relative to a viewport of the user device; calculating a number of words assigned to each of the plurality of virtual lines; tracking which virtual lines of the plurality of virtual lines can be displayed within the viewport of the user device; initiating a counter for the virtual lines displayed within the viewport of the user device; and generating read states for each of the virtual lines displayed within the viewport. The read states can be based on: a duration of time that each of the virtual lines displayed within the viewport remains in the viewport, and the number of words assigned to each of the virtual lines displayed within the viewport. The duration of time can be determined by the counter.

In an embodiment, the read states can be arrays comprising values representing a number of read words and a number of unread words, and the number of read words and the number of unread words can be calculated based on the duration of time determined by the counter.

In an embodiment, the computer system further performs transmitting one or more of the read states from the user device to a remote server.

In an embodiment, the computer system further performs generating a summation read state from one or more of the generated read states; and transmitting the summation read state from the user device to a remote server.

In an embodiment, the summation read states can be arrays of alternating signed non-zero integers representing alternating numbers of read words and unread words.

BRIEF DESCRIPTION OF THE DRAWINGS

For a better understanding of at least an embodiment, reference will be made to the following Detailed Description, which is to be read in conjunction with the accompanying drawings, wherein.

DETAILED DESCRIPTION

Figure 1:
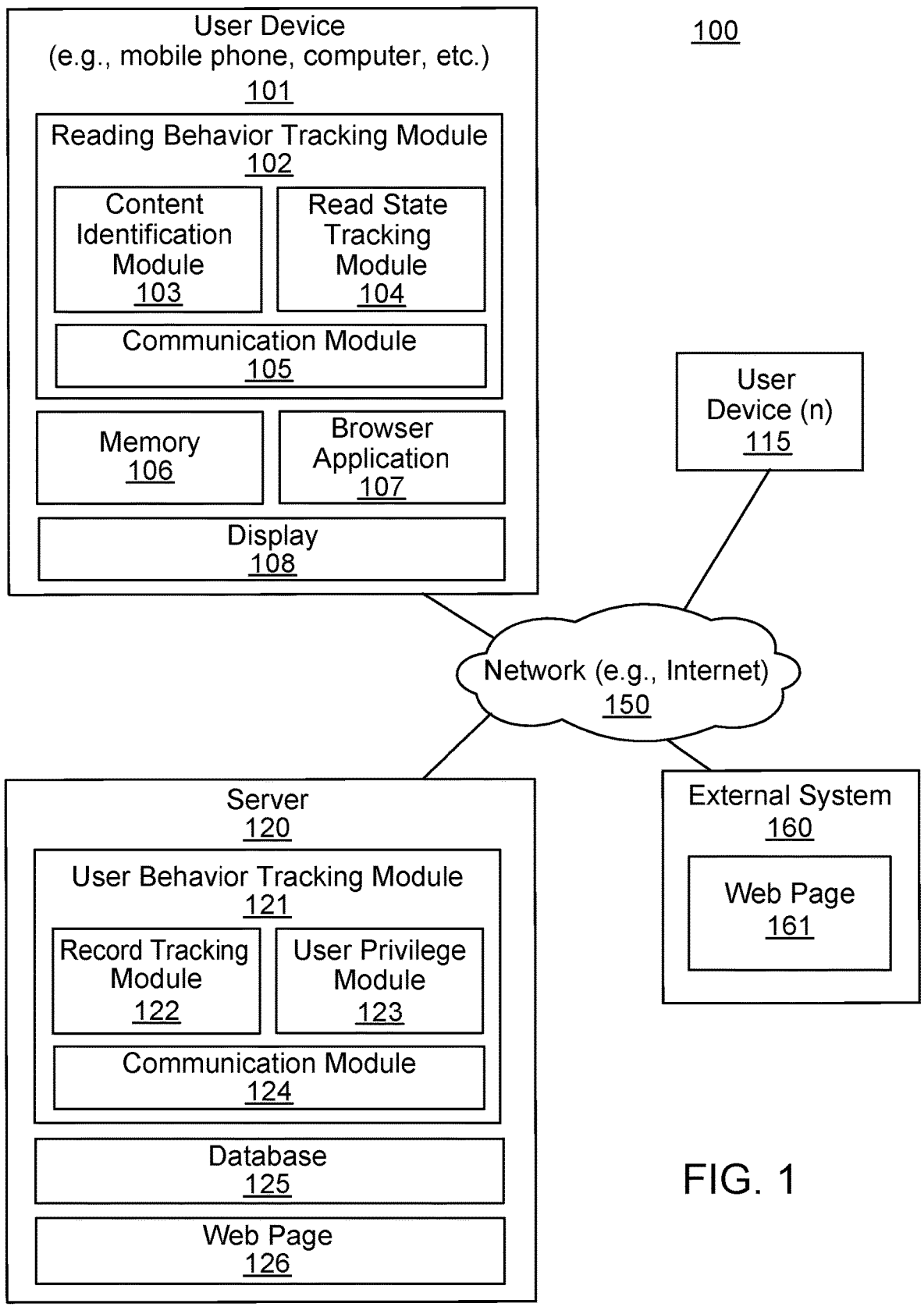
FIG. 1 illustrates a block diagram of an example read tracking system, according to an embodiment.

Before aspects of the present disclosure are described below with reference to the drawings in the description, common features may be designated by common reference numbers. Although certain examples are described herein with reference to a data storage system, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more conditions, or events not explicitly recited. As used herein, "exemplary" may indicate an example, an implementation, and/or an aspect, and should not be construed as limiting or as indicating a preference or a preferred example, implementation, and/or aspect.

In certain aspects, systems and methods are provided that can track reading behavior of users on the Internet (for example, navigating from web page to web page and scrolling up and down) and determine information about the reading behavior of the user, such as their reading progress for various reading content (e.g., blogs, news articles, articles from professional journals, stories, poems, or any other text-based content). End users can be provided interesting data, statistics, and analytics about their reading habits. In certain embodiments, specific user privileges can be set (e.g., enabled or unlocked) for people who fully read content. In certain aspects, the present disclosure can enable and assist advertisers to make smarter targeting and purchasing decisions. It can enable companies (e.g., websites) to facilitate better conversations and civil discourse amongst people on the Internet. It can enable publishers, journalists, and others in the media industry to have better insight into the reading habits and behaviors of the people who view their content. It can also assist various stakeholders that do not have good information about the reading habits of users. For example, teachers, lawyers, compliance officers, etc., could use the technology in the present disclosure to determine whether or not students, clients, employees, etc. are actually reading content that they are required to read.

Generally, a user utilizing a user device (or client device) accesses (or lands on, visits, etc.) various web pages that host various reading content. When the user accesses a web page, the web page can be scanned to determine whether or not the web page has reading content for the user to read. The "primary text" of the reading content is identified. The term "primary text" is used herein to refer to the actual text of the reading content. For example, the actual text would include all of the words and paragraphs of an article, free of any text for advertisements, comments, class names, header and footer information, or any other text that may be included in the Document Object Model (DOM) structure (e.g., the DOM tree) and not part of the actual contents of the article. The time spent on the page and the scroll behavior can be utilized to determine whether or not an article is being read by the user and, if so, how much has been read and what parts have been read. This data (or information) can be stored so that the user can leave the web page and return at a later time to finish reading. The data can also be stored and used to perform business and social functions for users.

FIG. 1 illustrates a block diagram of an example read tracking system, according to an embodiment. A read tracking system 100 is shown in FIG. 1 and includes a user device 101 communicatively coupled to a server 120 via one or more networks 150, which can include the Internet for instance. The number of user devices 101 can vary in different implementations and is represented in FIG. 1 by an $n^{th}$ user device 115. The server 120 and the user devices 101 can be communicatively coupled to one or more external systems 160 (e.g., remote third party systems) that host reading content. While only a single external system 160 is shown, additional external systems can be coupled to the network and provide reading content that the user devices 101 can access.

The user device 101 can be one or more computing devices, such as a desktop computer, a mobile phone or smart-phone, a tablet, a personal digital assistant (PDA), etc. The user device 101 can, for example, execute an application, such as a browser application, to allow the user to access websites and web pages on the Internet, such as on the external systems 160. The server 120 can include, for example, one or more servers for a system that responds to requests across a computer network, such as a web server for a website, social networking site, or other web service. The server 120 can be utilized to manage the subscription of users to the service provided by the server 120. For instance, the service can include, among others, providing lists (or collection, set, etc.) of reading content for users to choose from to read on their user device 101, as well as associated user privileges related to the reading content. The reading content can be accessed from wide variety of websites, such as web sites that provide news articles, blogs, articles from professional journals, etc. The service provided by the server 120 can include providing a list of reading content to the users, as well as a hyperlink to the web page of the external system 160 hosting the reading content. In another embodiment, the server 120 can host the reading content on one or more web pages, and provide a hyperlink to the reading content along with the list of the reading content to the user.

Figure 2:
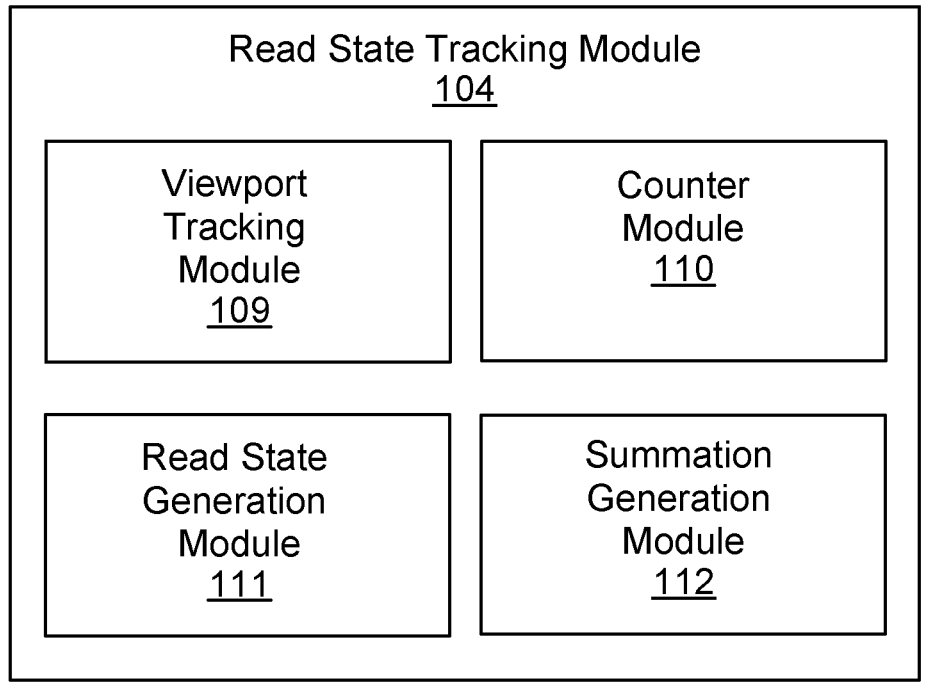
FIG. 2 illustrates a block diagram of the read state tracking module 104 shown in FIG. 1, according to an embodiment.

The user device 101 is shown including a reading behavior tracking module 102, a memory 106, a browser application 107, and a display 108. The reading tracking behavior tracking module 102 is shown including a content identification module 103, read state tracking module 104, and a communication module 105. FIG. 2 illustrates a block diagram of the read state tracking module 104 shown in FIG. 1, according to an embodiment. The read state tracking module 104 is shown including a viewport tracking module 109, a counter module 110, a read state generation module 111, and a summation generation module 112. To facilitate understanding, descriptions for both FIGS. 1 and 2 are provided together below.

The reading behavior tracking module 102 tracks the reading behavior of a user utilizing the user device 101, the browser application 107 that enables the user to access the reading content (e.g., via the Internet 150) via the web browser application 107, the display 108 for the user to view content, and the memory 106. In an embodiment, the reading behavior tracking module 102 can be implemented as an extension to the web browser application 107 installed on the user device 101. The browser application 107 can include, for example, Chrome™ Firefox™, Internet Explorer™, or any other web browser application 107. Other components of the user device 101, such as processors, input and output elements (e.g., keypad, touchpad, etc.), network interfaces, and the like are not shown so as to not obscure the details of the system 100.

The reading behavior tracking module 102 is shown including the content identification module 103, a read state tracking module 104, and the communication module 105. The content identification module 103 scans the contents of a web page and determines whether a web page has reading content that calls for tracking of the user's reading behavior. The content identification module 103 can further identify the primary text of the reading content on the web page. The content identification module 103 can use various techniques to determine the applicable reading content, such as scanning metadata, document object model (DOM), text nodes, class names, attribute data, text length, common ancestor data, etc. The content identification module 103 can also categorize the reading content into various sections and subsections, such as paragraphs and lines, respectively. The sections can correspond to text nodes of a DOM, for instance. In some instances, the text nodes of a DOM can be limited in granularity, such as to a paragraph. In such case, the content identification module 103 can further analyze the reading content to identify "virtual lines" within the text node, as well as the text within the lines. The term "virtual line" (or "virtual lines") is used herein to refer to a line (or lines) of text as positioned in (or relative to) the viewport and displayed on the user device. Data closely associated with the virtual line can include statistics (e.g., its read state and offset coordinates from its parent element) and stored in a data structure in memory associated with the virtual line.

The read state tracking module 104 tracks the reading behavior of the user and generates read states to represent the reading progress (or status) of the user with respect to the reading content. The read state tracking module 104 can identify the content that is displayed in a viewport of the user device 101. The viewport corresponds to the content displayed in the display 108 on the user device 101 for the user to view. The contents in the viewport change as the user navigates different web pages and scrolls through content. As shown in FIG. 2, the read state tracking module 104 can include a viewport tracking module 109 that tracks the content in the viewport at any given time. In an embodiment, the viewport tracking module 109 tracks the contents in the viewport on a subsection granularity, such as per virtual line.

The read state tracking module 104 can initiate a counter (or timer) that counts at a predetermined rate when content is present in the viewport. As shown in FIG. 2, the read state tracking module 104 includes a counter module 110 that starts and stops the counter to track time that elapses while content is in the viewport. The predetermined rate (or predetermined reading rate) can be set to emulate the reading speed of the user, and can vary in different embodiments. For example, in an embodiment, the predetermined rate can be a rate between 150 and 200 words per minute, such as between 180 and 190 words per minute, which is typical or average for users in general. It should be appreciated that rates outside 150 to 200 words per minute can also be used in other embodiments.

The count applies to the contents in the viewport and represents the number of words of the contents in the viewport that the user has read. The number of read words per count (e.g., per second) will vary depending on the predetermined rate set for the counter. For instance, if the count occurs at intervals of 1 second, then a predetermined rate of 60 words per minute will correspond to 1 word read per count of 1 second. As another example, a rate of 180 words per minute will correspond to 3 words read per count of 1 second. The counter's interval of time can also vary. For instance, if the count is increased and occurs at intervals of one third of a second, then a predetermined rate of 180 words per minute will correspond to 1 word read per count of one third of a second.

For example, using an interval count of 1 second and a predetermined rate 60 word per minute as an example, if the count reaches 10, then it can be determined that the first 10 words are read. The count can begin at the most upper-left unread word in the viewport. The content can also be divided into sections and subsections, in which case the count can begin with the most upper-left unread word of the most upper-left unread (or partially unread) subsection (e.g., line). This technique can be utilized to align with reading formats that begin at upper-left and continue across and down the page. It should be appreciated that variations can be implemented in other embodiments in order to accommodate different reading formats, such as those that read right to left and down a page, without compromising the underlying principles of the present disclosure.

The count is used to identify the read and unread portions of sections or subsections in the viewport, such as paragraphs and virtual lines, respectively. For example, if the count is at 6 (words) and a subsection (e.g., virtual line) has 10 words, then it can be determined that the user has read the first 6 words of the subsection and has not read the last 4 words of the subsection, in which case the subsection is only partially (or 60%) read. When the count reaches the total number of words in the subsection, then the subsection is considered completely "read," and the count then continues to the next subsection in the viewport. When all subsections (e.g., lines) in a section (e.g., paragraph) is read, the section is considered completely (or 100%) "read," and the count continues to the next section in the viewport.

As shown in FIG. 2, the read state tracking module 104 includes the read state generation module 111 that generates read states for the content in the viewport. For example, the read states of sections and subsections can be represented by the number of words read and unread (e.g., 6 words read and 4 words unread). In another embodiment, the read states can be represented by a percentage (e.g., 60% read). The read state tracking module 104 can save (or log, record, etc.) the read states. For example, when a subsection exits the viewport, the corresponding read state (e.g., read and unread portions) for the subsection is saved. When the subsection again enters the viewport and the count becomes applicable to the subsection, then the count can resume at the same point it left off. For example, in the example above, the count would begin at the 7$^{th}$ word of the 10 word subsection.

In an embodiment, the read state generation module 111 saves the read states as a set of values (or array of values) representing read and unread words. For example, an array [6, −4] can be implemented to represent that the first 6 words of a subsection have been read and the last 4 words of the subsection has not been read. Again, read states may be generated for various granularities, such as for subsections, sections, or content as a whole.

In certain aspects, read states can enable users to read various reading content out of order, and have the system track and model the actual progress for each of the various reading content. The read states can be utilized to give a high resolution view of how users interact with the articles, such as whether they read the entire content, only read the beginning of content, skim the content, etc. This can also indicate the varying interest levels of different content based on how much of the article was read. Data collected for a collection of users, or individual user, can be processed to generate assumptions (or conclusions) about user preferences. For example, the data can be analyzed to identify a wide range of characteristics or patterns, such as preferences for various types of content, dislike for certain content, user interests, user expertise, etc.

The read state tracking module 104 shown includes the summation generation module 112, as shown in FIG. 2). The summation generation module 112 provides a summed result for a plurality of read states within the content, such as a summation of the read states of all subsections in a section. A summation read state can also be generated for the entire content as a whole.

The summation read state can be represented in various manners. For example, in an embodiment, the read state can be implemented as an array of alternating signed non-zero integers representing read and unread words. For example, for a 1200 word article, the summation read state can have two values (e.g., [200, −1000]) and represent a partial linear progress of the user having read 200 words of the 1200 word article, for instance. The summation read state can also include more than two values (e.g., [200, −50, 100, and −850]) and represent a partial non-linear progress of the user having read the first 200 words, having not read the next 50 words, having read the next 100 words, and having not read the last 850 words of the 1200 word article. The summation can also include only a single value, such as [−1200] or [1200], to represent that the user has read none, or all, of the 1200 word article, respectively. The read state tracking module 104 can save data (e.g., read states, summation read states, etc.) within the memory 106 of the user device 101. The summation read states can be communicated to the server 120 in real time or at predetermined intervals of time, such as every 10 seconds, 30 seconds, or any other interval of time. The summation read states can be communicated upon triggering of events, such as closing the reading content (e.g., navigating to another website).

The user device 101 also includes the communication module 105, which can send data to, and receive data from, the server 120. The communication module 105 can operate in conjunction with a transmitter, receive, or transceiver to transmit (or receive) data via a wired or wireless communication protocol. The communication module 105 can be utilized to send summation read states to the server 120. The summation read states can be relatively small in size and minimizes the amount of data sent to the server 120. For example, in one embodiment, an exemplary and non-limiting test use case yielded an average of 10.7 values (or elements) within an array; a max of 652 values within an array, with a size of 510 bytes gzipped; less than 50 values within 95% of arrays; and less than 100 elements in 99% of the arrays.

Figure 3:
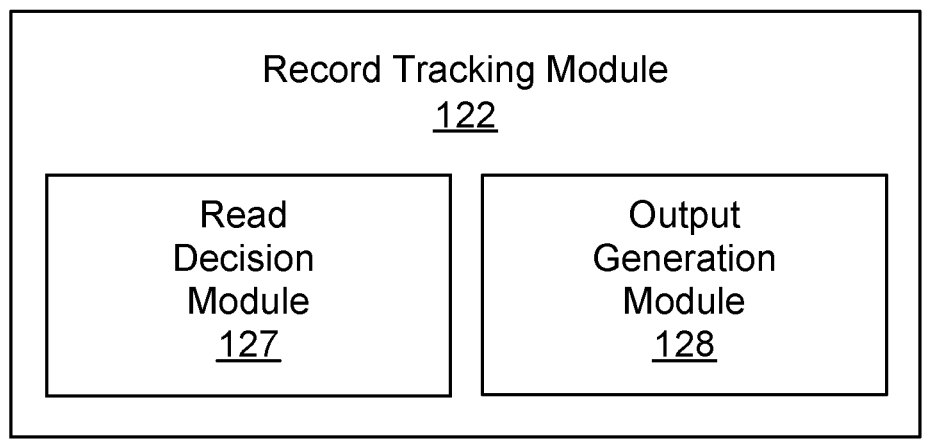
FIG. 3 illustrates a block diagram of the record tracking module 122 shown in FIG. 1, according to an embodiment.

In FIG. 1, the server 120 is shown including a user behavior tracking module 121, a web page 126 module, and a database 125. The user behavior tracking module 121 is shown including a record tracking module 122, user privilege module 123, and a communication module 124. FIG. 3 illustrates a block diagram of the record tracking module 122 shown in FIG. 1, according to an embodiment. In FIG. 3, the record tracking module 122 is shown including a read decision module 127 and an output generation module 128. To facilitate understanding, description for both FIGS. 1 and 3 are provided together below.

The web page can include a list of reading content to the users, as well as a hyperlink to the web page of the external system 160 hosting the reading content. In another embodiment, the server 120 can host the reading content on one or more web pages 126, and provide a hyperlink to the reading content along with the list of the reading content to the user. The database 125 can include various data, such as user profile information, user authentication data (e.g., logins, passwords, etc.), read states for various content and users, etc. Other components, such as processors, input and output elements, network interfaces, and the like are not shown so as to not obscure the details of the system.

The user behavior tracking module 121 tracks and manages data related to reading content, as well as data related to the reading behavior of users with respect to the reading content. The user behavior tracking module 121 includes the record tracking module 122 that can manage data related to the reading behavior of users (e.g., read states) with respect to the reading content, etc. In embodiments where the server 120 maintains the actual text of the reading content, the record tracking module 122 can receive the primary text of content from a user device 101 or from an external system 160 and determine whether the content already exists within the collection of reading content stored in the database 125 on the server 120. The database 125 can be stored locally or remotely to the server 120 in various embodiments.

The user behavior tracking module 121 can also include the user privilege module 123 that manages (e.g., enables and disables) user privileges with respect to various content for users. Example user privileges can include, but are not limited to, the ability to view comments for reading content, the ability to comment on reading content, the ability to share reading content, the ability to like reading content, the ability to rate reading content, etc.

The record tracking module 122 includes a read decision module 127 that can indicate whether a user has "read" (or sufficiently read) reading content. For example, the read decision module 127 can acquire a summation read state (e.g., received from a user device 101) for a specific user and content to determine whether the user has "read" the content, not read the content, or partially read the content (e.g., only read a percentage of the content). For example, in an embodiment, a predetermined threshold value can be used to determine if the user has read (or sufficiently read) all of the content. For instance, if the threshold is 90%, then a user is determined to have read the content if the read decision module 127 determines that the user has read 90% or more of the content. For example, a summation read state of content read by a user may be [900, 100], indicating that 900 words have been read and 100 words have not been read, thus meeting the predetermined threshold of 90%. The predetermined threshold can vary in different embodiments. In one embodiment, the predetermined threshold is 100% for content to be considered completely "read." Various user privileges can be enabled or disabled based on whether the threshold has been met. In one embodiment, more than one predetermined threshold can be set to provide various user privileges associated with each predetermined threshold. For instance, a 50% threshold may be set to enable users to "like" an article, but a 100% threshold to comment on the article.

The record tracking module 122 maintains records (e.g., a table) of data related to the users and the collection of content. For example, a table can be generated for users and include identifying information or attributes related to the reading content (e.g., title, author, publisher, date of publication, etc.) that the user has accessed, any associated read states (e.g., summation reading states) for the reading content, etc. The table can also include other associated attributes or statuses that are determined from the associated read states, such as whether the user has been determined to have "read" (or sufficiently read) each content; the percentage of the article that has been read; the statuses of one or more user privileges, the number of words in the reading content, an estimated time to read the reading content, etc.

The record tracking module 122 can also include an output generation module 128 that updates the web pages 126 according to the data in the records. For example, in an embodiment, the web page 126 can include a list of articles and associated comments from users, with the articles being ranked or listed based on popularity derived from a calculation of the number of users that have been determined to have read the article. As the popularity of articles change, the output generation module 128 changes the order of the articles accordingly.

The output generation module 128 can also render the web pages 126 specific to each user so that each user can view the web pages 126 with their own user-specific data integrated. For example, if a user "John" is logged and viewing the web pages 126, the web pages 126 can include indicators of metrics specific to John, such as the percentage of each article that has been read by John. Furthermore, one or more user privileges specific to John for each of the articles will be reflected on the web pages 126, enabling John to use the privileges accordingly. In an embodiment, users that are not logged in, or non-subscribing users, can view the web pages 126 in a generic format without any user-specific data integrated.

The output generation module 128 can also render the web pages 126 for a collection of users (e.g., a category of users, all users, etc.) so that each user can view the web pages 126 with metrics related to the collection of users. For example, a combined ratings score (e.g., an average score) for users who have read the article can be provided for the article for users to see, such as next to the article included in the list of articles shown on the web pages 126. In another embodiment, the combined ratings score can be implemented as an embeddable article rating display widget that can be used to display the combined ratings score on various websites, such as third party websites. In this way, viewers of the third party websites can see the article's combined ratings score and use it as a known reference point associated with the user-subscribing service. In one embodiment, non-users can also be permitted to see the combined ratings scores for various reading content.

The communication module 124 on the server 120 can be used to communicate with the user device 101. The communication module 124 can operate in conjunction with a transmitter, receiver, or transceiver to transmit and receive data via a wired or wireless communication protocol. The communication module 124 can receive data (e.g., read states, summation states, reading content, etc.) from the communication module 105 on the user device 101. The web pages 126 can be transmitted to the user device 101 via the communication module 124. As web pages 126 are updated to reflect and include user-specific data. The user-specific data, such as user privileges, can be communicated to the user device 101 via the communication module 124.

In one embodiment, the server 120 having the user behavior tracking module 121 can be a third party system that does not maintain reading content on its own web pages 126, but rather provides read tracking service for one or more external systems 160 having reading content (e.g., web pages including articles). For example, a company may host articles on their website (e.g., web page 161 of the external system 160) and utilize the read tracking service of the third party (e.g., server 120). When users access the company's website, the server 120 can track the reading behavior of the users to determine if the users have read any of the articles hosted on the company's website. If, for example, the server 120 determines that an article has been read by a user, then the server 120 can enable the user to have certain privileges related to the article (e.g., see the comments, comment on the article, like the article, share the article, rate the article, etc.).

In another embodiment, the web pages 126 on the server 120 can include reading content for users to view and read, such as with a website providing news articles. The reading behavior tracking module 102 on the user device 101 and the user behavior tracking module 121 of the server 120 can be utilized to track the users reading behavior. For example, the content identification module 103 of the user device 101 can identify the primary text of the reading content (e.g., text of an article) on the web page 126 with the reading content. User data (e.g., read states) for the article can be tracked for the user and the corresponding article.

In yet another embodiment, the web pages 126 on the server 120 can include copies of reading content from one or more remote external systems 160 that publish reading content for users to view and read. For example, in FIG. 1, an exemplary external system 160 is shown that can manage the publishing reading content on one or more web pages 161. The external system 160 can be separate from the server 120 in that it may be operated by a different entity. The reading behavior tracking module 102 on the user device 101 and the user behavior tracking module 121 of the server 120 can be utilized to enable users to visit the web pages 161 on the external system 160 and to have the users reading behavior tracked. For example, when a user visits the web page 161 of the external system 160, the content identification module 103 of the user device 101 can identify the primary text of the reading content (e.g., text of an article) on the web page 161. The primary text can be sent to the server 120 having the user behavior tracking module 121 in order to determine if the article is already stored in the database 125. If the article is already stored in the database 125, then user data (e.g., read states) for the article can be tracked for the user and the corresponding article. If the article is not already in the database 125, then the record tracking module 122 of the server 120 can generate a record for the article and track the reading states of users with respect to that article. The article itself can be stored in the database 125 and included in the collection of reading content provided on its own web page 126.

Figure 4A:
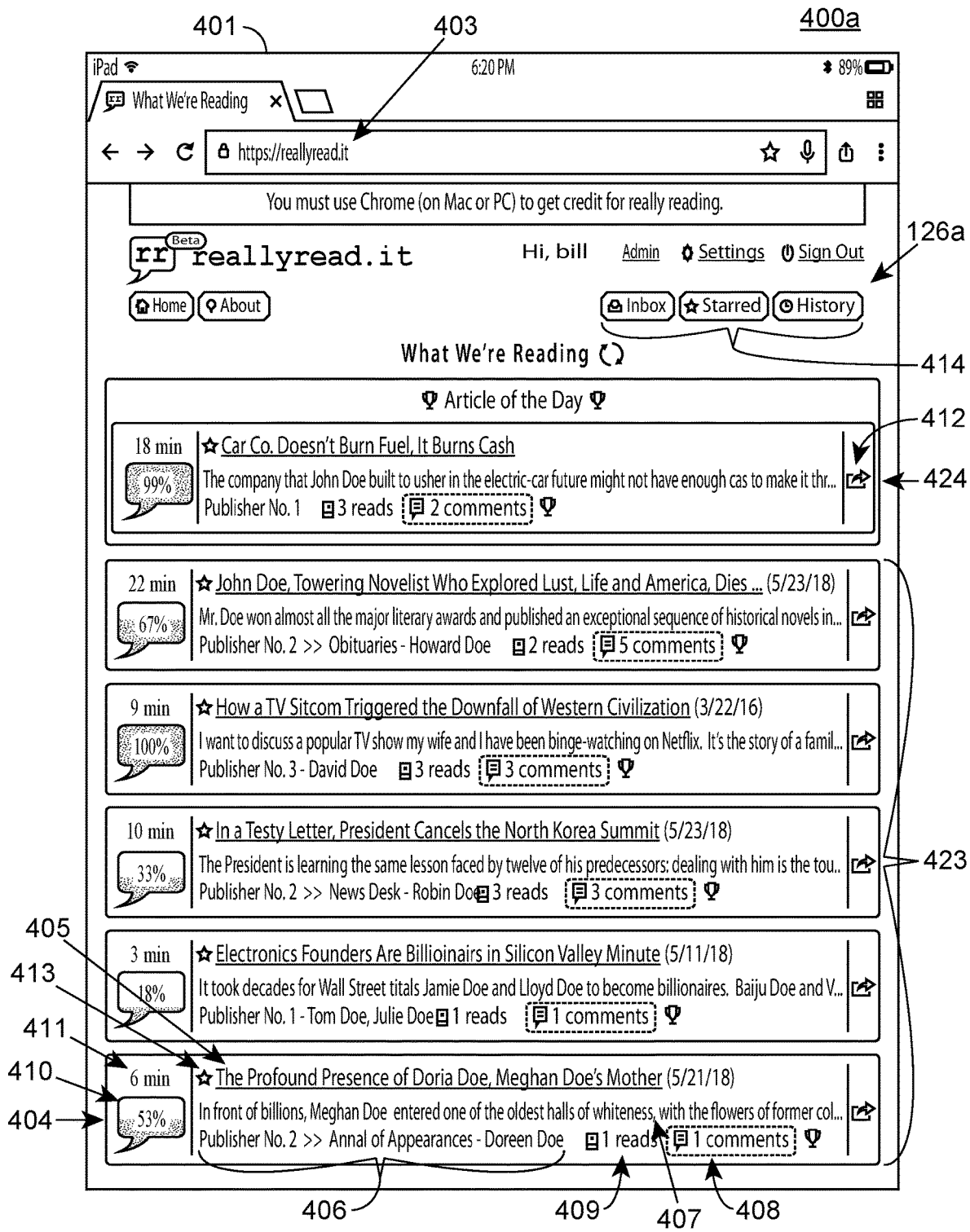
FIG. 4A illustrates a diagram of an example graphical user interface (GUI) including a web browser displaying a web page on a user device for a specific user, according to an embodiment.

FIG. 4A illustrates a diagram of an example graphical user interface (GUI) including a web browser displaying a web page on a user device for a specific user, according to an embodiment. In FIG. 4A, a GUI 400a is shown including a web browser 401 displaying a web page 126a and the corresponding URL 403 at which the web page 126a is located. The GUI 400a can be displayed, for example, on the user device 101 of FIG. 1. The web page 126a is shown including a list of reading content 423 (e.g., articles 423), in which a reading content 404 (e.g., article 404) is shown as a representative example. A title 405, source info (e.g., publisher, author, etc.) 406, and excerpt 407 of the article 404 is shown. The title 405 can be a hyperlink to another web page having the actual text-based contents of the article 404. In this way, the user can click on the title 405 of the article 404 to view the text of the article. The actual text-based contents can be located on another web page, such as hosted on the server 161 of the external system 160 shown in FIG. 1. In an embodiment, the text-based contents can be displayed in a pop-up window for the user to read.

An indicator 408 is shown for the article 404 and represents a total number of user comments for the article. The indicator 408 can be a hyperlink to a web page 126 with the actual user comments so that the user can read the comments. In one embodiment, access to the comments is provided as a user privilege that is provided to the user when the user reads the article, or sufficiently reads the article (e.g., a predetermined percentage of the article is read). In another embodiment, access to the comments is not restricted but the ability to comment is provided as a user privilege. The number of comments can serve as an indication of the popularity of the article. An indicator 409 is shown for the article 404 and represents a total number of times the article has been read by users (e.g., the total number of users that have read the entire article). The number of times the article has been read can serve as an indication of the popularity of the article. In one embodiment, the articles 423 can be ranked based on one or more of the indications of popularity.

An indicator 410 represents the user's reading status of the article 404. The indicator 410 is shown in this example as a speech balloon with the percentage of the article that is read is indicated as a number inside the speech balloon. Furthermore, the corresponding percentage of the speech balloon is filled (e.g., with a different color) to provide an additional visual indication of the percentage read.

An indicator 411 is shown for the article 404 and represents the estimated length of the article in the units of time—or put another way, the estimated time it will take a user to read the article. An indicator 412 is shown for the article 404 and enables a user to download or share the article 404. For example, the user can click on the indicator 412 to save, email, share on social media, etc. In one embodiment, the ability to download or share the article 404 is provided as a user privilege. An indicator 413 is provided and enables a user to "star" or save an article for future reference. Additional indicators 414 can also be included to provide various actions for the user, such as checking their inbox, viewing reading content that the user has "starred" or saved, viewing their history of articles that they have been reading.

An article of the day 424 is highlighted and provided in addition to the list of articles 423. The article 424 can be shown at the top of the list to further highlight and bring attention to the article. The article of the day 424 can be selected by the server 120 for any of a variety of reasons, such as based on the popularity of the article (e.g., how many users have read the article, commented on the article, liked the article, or combination thereof). In another embodiment, the article of the day 424 is not provided by the web page 126a.

Figure 4B:
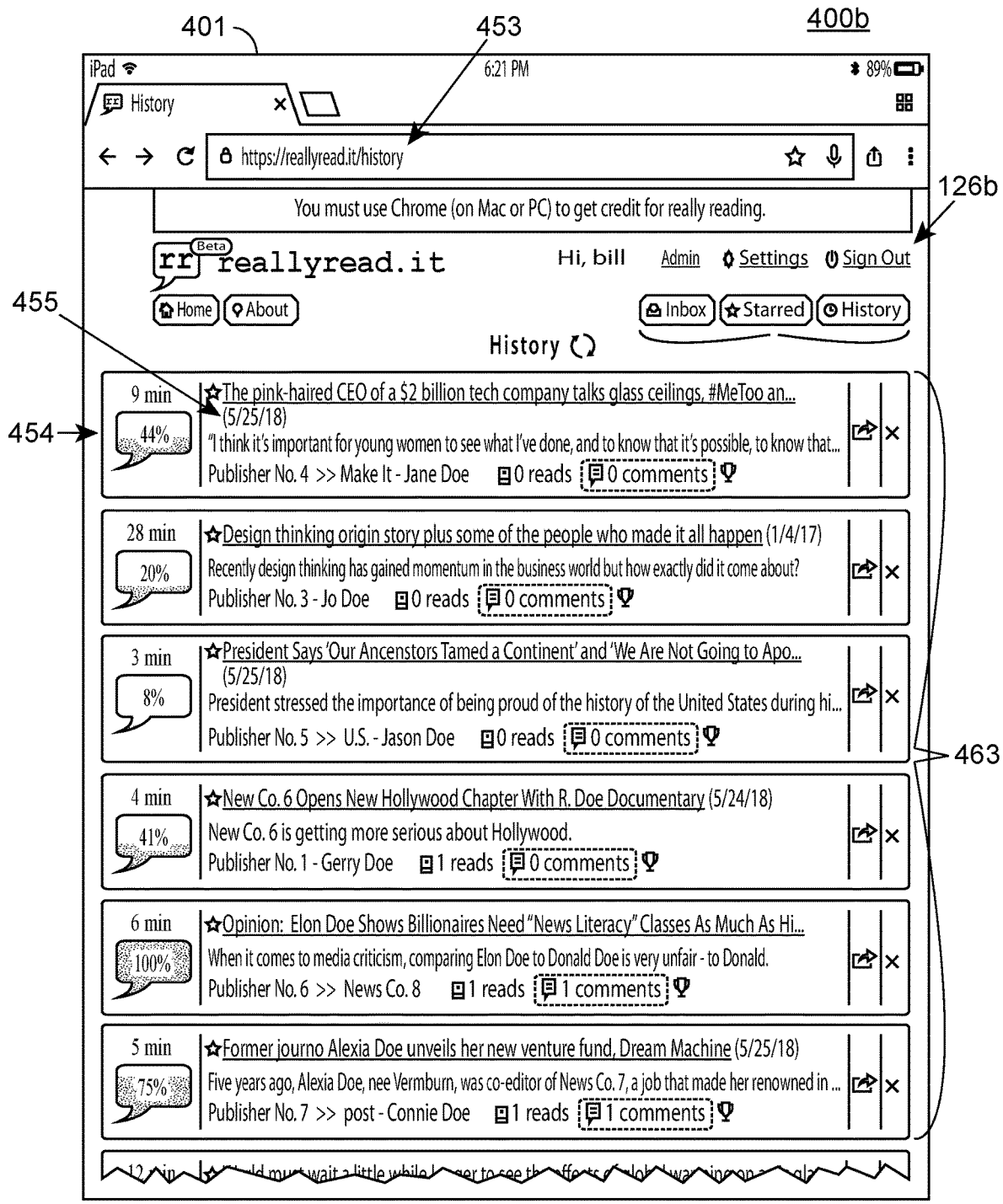
FIG. 4B illustrates a diagram of an example GUI including a web browser displaying a web page showing the reading history of a specific user, according to an embodiment.

FIG. 4B illustrates a diagram of an example GUI including a web browser displaying a web page showing the reading history of a specific user, according to an embodiment. In FIG. 4B, a GUI 400b is shown including a web browser 401 displaying a web page 126b and the corresponding URL 453 at which the web page 126b is located. For the sake of clarity and brevity not all common features and function to those shown in FIG. 4A are described again here in FIG. 4B. The web page 126b is shown including a list of articles 463 that the user has previously accessed (or viewed), in which reading content 454 (e.g., article 454) is shown as a representative example. In addition to the indicators listed in FIG. 4A, the article 454 is shown with indicators 455 and 456. The indicator 455 represents the date in which the user last accessed the article 454. The indicator 456 enables a user to delete the article 454 from the list of articles 463.

It should be appreciated that the elements shown in FIGS. 4A and 4B are illustrative and non-limiting examples, and that in other embodiments, different elements (e.g., images or types of indicators) or arrangement of elements can be implemented. Furthermore, additional features and functions other than those shown can be provided on the web page, some of which can be provided as users privileges that are enabled with respect to the user's reading behavior.

In order to provide certain features and functions of the reading behavior tracking module 152 (e.g., identify the primary text of an article and track the user's reading progress), the user device 101 can utilize the DOM of the article HTML document. In one embodiment, the user device can install a web browser extension that instructs the web browser to execute a script in the context of the requested web page every time the user loads a new page. In another embodiment, a web browsing context can be embedded within a native application that exposes an API, which allows the script to be injected after a new web page is loaded. In yet another embodiment, the publisher of the article HTML document can include a script tag that instructs the browser to download or parse and execute the script when the document is parsed by the web browser.

Figure 5:
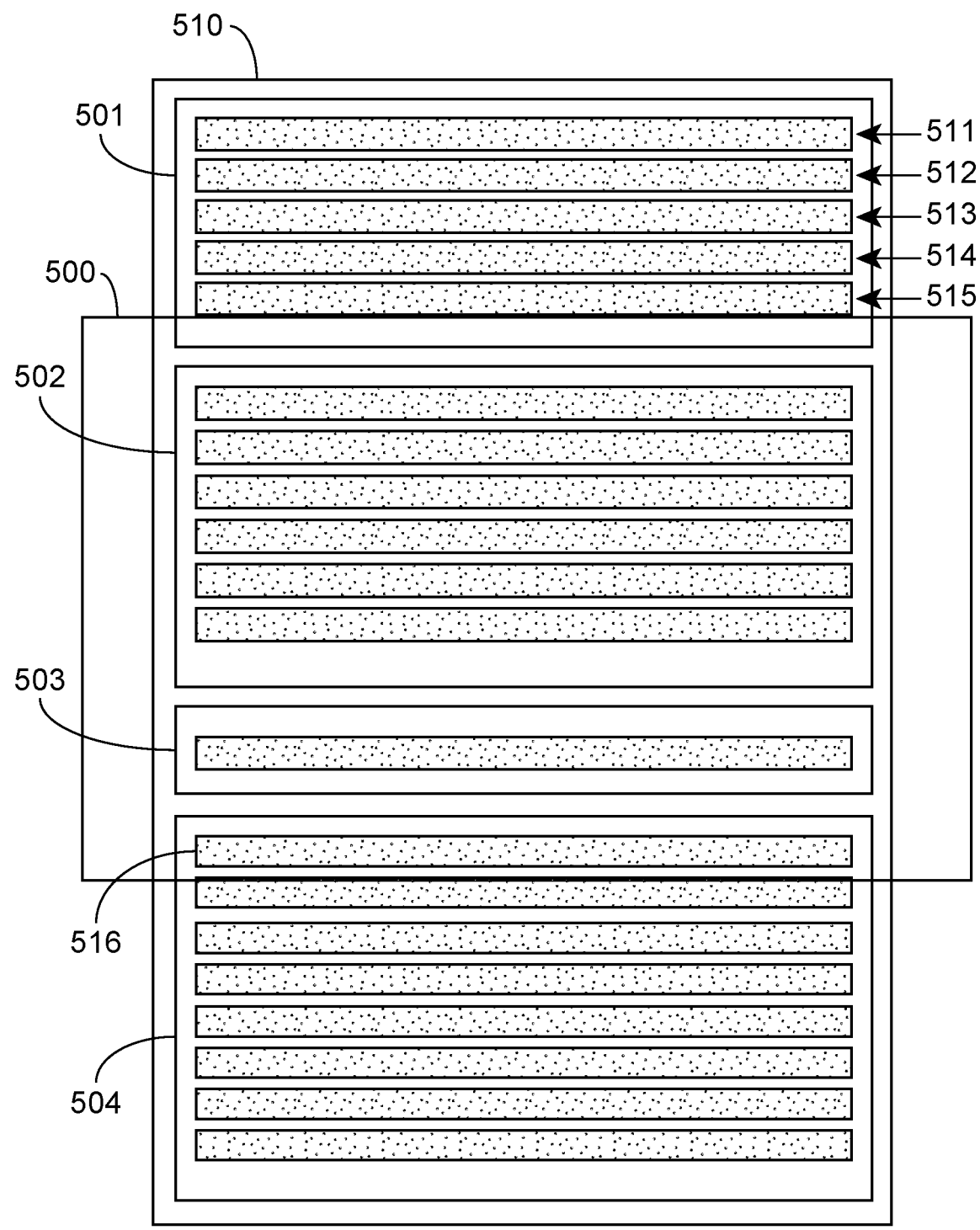
FIG. 5 illustrates a diagram of reading content from a web page that is tracked by a viewport in order to determine read states for the reading content, according to an embodiment.

FIG. 5 illustrates a diagram of reading content from a web page that is tracked by a viewport in order to determine read states for the reading content, according to an embodiment. In FIG. 5, a viewport 500 is shown superimposed over reading content 510. The reading content 510 shown is larger than the area shown in the viewport 500. The portion of the reading content 510 that is in the viewport 500 can change as the user scrolls through the reading content 510. The reading content 510 is shown including sections 501, 502, 503, and 504. The reading content 510 is shown as a text-based document (e.g., an article) that is divided into sections 501, 502, 503, and 504, such as derived using text nodes from a DOM. The sections 501, 502, 503, and 504 can align with the paragraphs of the article, for example. The sections can be processed to identify virtual lines for the text nodes that are larger than line-by-line granularity. Each of the virtual lines can be a subsection of its corresponding section. For example, the section 501 is shown including an array of 5 virtual lines 511, 512, 513, 514, and 515.

The viewport 500 is shown to include only a portion of the reading content 510. More specifically, the viewport 500 includes the entire sections 502 and 503 and their corresponding subsections (e.g., virtual lines). None of the subsections 511, 512, 513, 514, and 515 of section 501 are visible in the viewport 500, and only the first subsection 516 (e.g., the first virtual line) of section 504 is shown in the viewport. A counter (e.g., the counter module 110 of FIG. 1) can be initiated and applies to the portion of the reading content 510 that is visible in the viewport 500. The counter begins, for example, from the most upper-left unread word in the most upper-left virtual line (or subsection).

The following example is provided as an illustrative and non-limiting example to facilitate understanding. If the first virtual line 511 of section 501 includes 20 words, which have all been read, then the read state for the virtual line 511 can be generated as an array having the value of 20—e.g., [20]. If the second virtual line 512 of section 501 has 24 words, which have all been read, then the read state for the virtual line 512 can be generated as an array having the value of 24—e.g., [24]. If the third virtual line 513 of section 501 includes 23 words, with the first 2 words computed as read and the last 21 words computed as unread, then the read state for the virtual line 513 can be generated as an array having the values of 2 and −21—e.g., [2, −21]. If the fourth virtual line 514 of section 501 has 15 words, all of which indicated as unread, then the read state for the virtual line 514 can be generated as an array having the value of −15—e.g., [−15]. If none of the words have been read in the fifth virtual line 515 of section 501, then no array is generated for the virtual line 515. In another embodiment, an array with a null or zero value (e.g., [0]) can be generated for virtual lines that have no words read.

To generate a summation read state for the 4 virtual lines, each of the read states for the 4 virtual lines are added together to generate an array having the total number of read words and total number of unread words (e.g., [46, −36] or 46 read words and 36 unread words). Summation read states can be provided for any number of subsections, sections, for the entire content as a whole, etc. For example, in the section 501, a summation read state can be computed as similarly shown for the 4 virtual lines above, since the fifth virtual line 515 did not include any read words. The summation read states can be stored on the user device 101 (e.g., when subsections exit the viewport 500) and split back out over the corresponding subsections when needed (e.g., when the subsections reenter the viewport 500). A summation read state can be generated for the content as a whole as well. One or more of the summation read states can be sent to the server 120 after they are generated, at predetermined intervals, or upon a predefined triggering event such as ending user-access to the reading content (e.g., closing or leaving the web page with the contents of the article).

Figure 6:
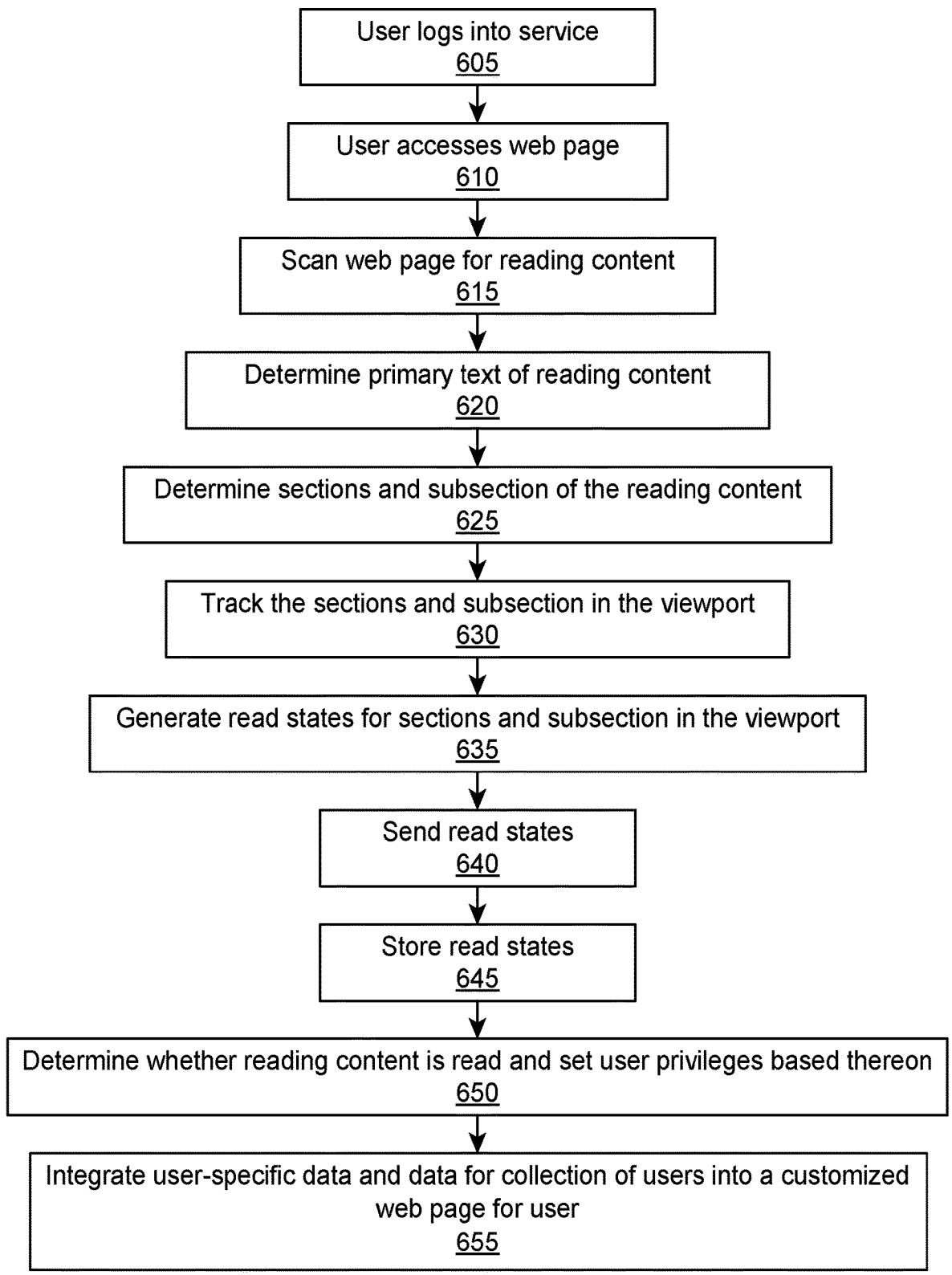
FIG. 6 illustrates a flowchart for an exemplary method of tracking reading behavior of users, according to an embodiment.

FIG. 6 illustrates a flowchart for an exemplary method of tracking reading behavior of users, according to an embodiment. At block 605 of a method 600, the user logs into the service provided by the server 120. For example, the server 120 can be in communication with one or more users via one or more user devices 101. The server 120 can provide web pages 126, for instance, that users can access and view via a user device 101. The users can be required to login with a username and password. The server 120 can manage the subscription of users to provide customized user-specific metrics and data integrated within the web page 126. In one embodiment, non-subscribers can still access and view the web page 126 without any user-specific metrics and data integrated. For example, the web pages 126 can include the example web pages 126a and 126b shown in FIGS. 4A and 4B. In order to access reading content, such as those listed on the web pages 126a and 126b, the user device 101 can select articles (e.g., by clicking on a hyperlink for the articles) and be directed to the corresponding web pages 161 hosting the reading content. The web pages 161 can be hosted by external systems 160 that are hosted by one or more remote third party companies. For example, in the web page 126a shown in FIG. 4, a user can select an article from the list of articles 423, at which point the user device 101 will be directed to the corresponding remote third party website of at an external system 160 that hosts the corresponding article 423 on its web page 161. In another embodiment, some or all of the reading content can be hosted on the web pages 126 of the server 120 in addition to the exemplary web pages 126a and 126b.

A user utilizing a web browser application 107 on the user device 101 can be permitted to log in to the read tracking system 100 with a unique username and corresponding password. The user device 101 includes the reading behavior tracking module 102, such as described herein. The user can then access reading content, which can be hosted on the external systems 160, and have his or her reading progress tracked. In another embodiment, some or all of the reading content can be hosted on the server 120.

At block 610, the user accesses web pages with reading content (e.g., web page 161) using the user device 101. The web page with reading content can be displayed on the display 108 on user device 101.

At block 615, the web page is scanned for reading content. For example, the DOM structure (e.g., the DOM tree) of the web page is received and analyzed by the user device 101 to determine whether the web page has reading content requiring tracking of user reading behavior. The system can utilize the web page's metadata to determine if it appears to be an article before attempting to identify the primary text. The metadata can include, for example, META HTML elements that contain miscellaneous metadata or OpenGraph metadata and schema.org metadata in the form of Microdata, RDFa or JSON-LD. In addition to these general checks, the page's URL can be checked against a database of patterns that have been entered in order to override the default processing rules for specific publishers or sections of their site.

Figure 7A:
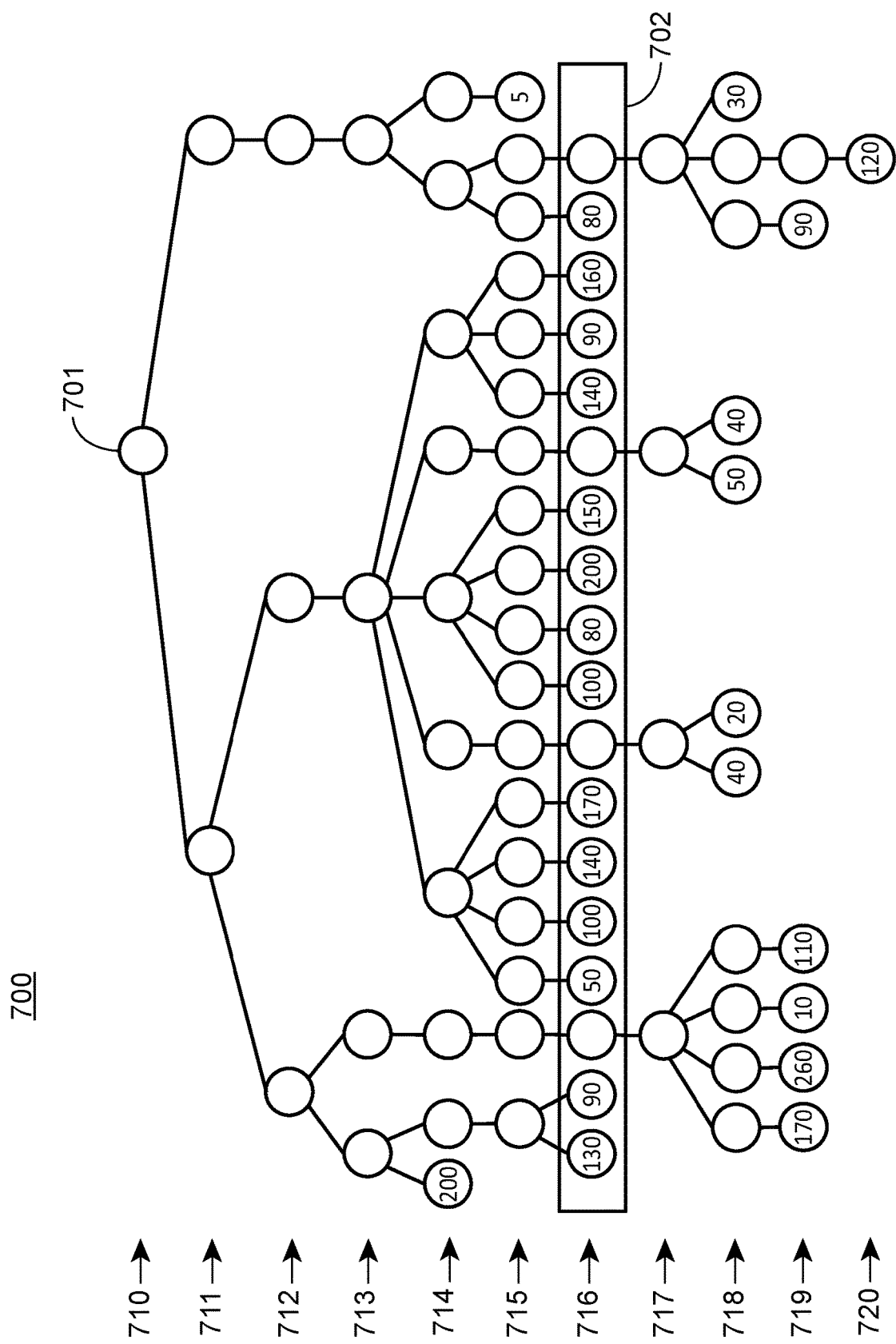
FIGS. 7A and 7B illustrate diagrams of an example DOM structure (or HTML document structure) of a web page being used to identify the primary text of the reading content, according to an embodiment.
Figure 7B:
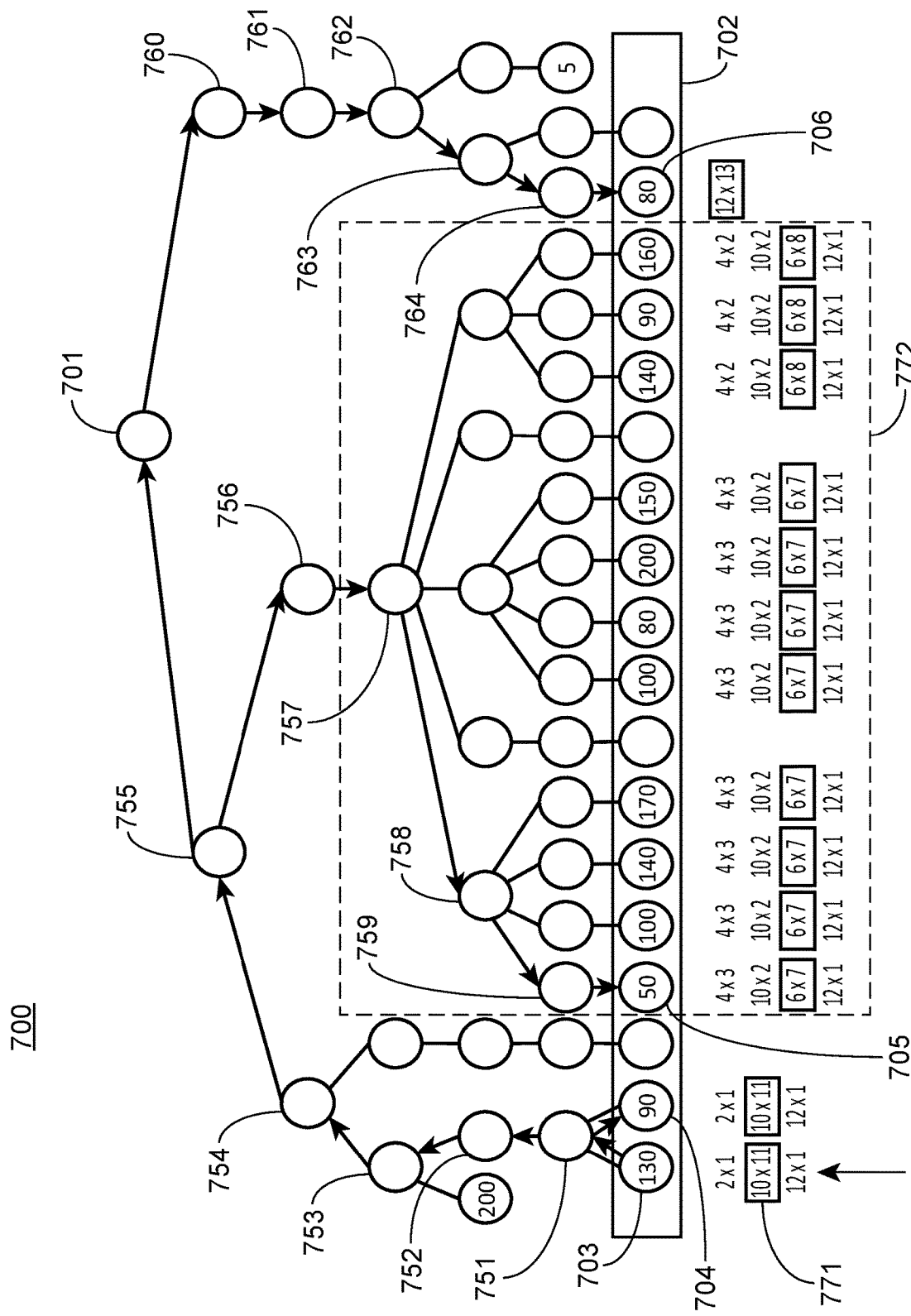

At block 620, the primary text of the reading content is identified by analyzing the DOM structure. FIGS. 7A and 7B illustrate diagrams of an example DOM structure (or HTML document structure) of a web page being used to identify the primary text of the reading content, according to an embodiment. FIGS. 7A and 7B are provided as an illustrative and non-limiting example to facilitate understanding of how to identify the primary text of reading content. In FIGS. 7A and 7B, a DOM structure 700 is shown including nodes represented by circles and branches represented by lines. Empty circles represent element nodes and circles with numbers inside represent text nodes. The numbers represent a word count for the text node. The dome tree 700 includes 10 levels of nodes (levels 710, 711, 712, 713, 714, 715, 716, 717, 718, 719, and 720). A root node 701 is shown at level 710 and each level 711, 712, 713, 714, 715, 716, 717, 718, 719, and 720 progressively increases in distance from the root node 701. The nodes in a given level are referred to herein as a "group" of nodes within that level.

In order to determine an article's primary text separate from any other text of the HTML document, such as text in a header, sidebar, advertisement, footer, user comment, etc., the DOM structure 700 can be walked and references stored to all the document's text nodes. Statistics are calculated and stored along with each text node reference to help determine if it is part of the article's primary text. These statistics include the number of words contained within the text node as well as the distance (measured by number of ancestors) between the text node and the document's root node 701.

During the process of walking the DOM structure 700, certain text nodes can be excluded from consideration because one of their ancestor element nodes is determined to be an undesirable element based on its metadata. Certain metadata is used to identify undesirable elements globally, such as the element's type (e.g., <header>, <footer>, <nav>) or class name (e.g., "comments", "ad", "sidebar"), while other more specific metadata exclusion rules might apply on a per-publisher basis based on the publisher's unique metadata used to describe the structure of their article documents.

Once the DOM structure 700 has been completely traversed, the list of potential article text nodes is grouped based on the distance from the document's root node. For example, there is 1 potential article text node in each of the levels 714, 715, and 720; and 5 potential article text nodes in each of the levels 718 and 719. The group of text nodes with the largest cumulative word count is determined to be the group most likely to contain the text nodes that comprise the article's primary text. The group of text nodes in level 714 has 200 words, the group in level 715 has 5 words; the group in level 716 has 1680; the group in level 718 has 180; the group in level 719 has 640; and the group in level 720 has 120. Therefore, in this example, the group of text nodes in level 716 has the largest cumulative word count of 1680 and is thus the group most likely to contain the text nodes that comprise the article's primary text. The group of nodes in level 716 have been highlighted accordingly by the box 702 to represent the group with the largest cumulative word count and the article's primary text.

Additional statistics are then calculated for text nodes within the group in level 716 by calculating the frequency of unique traversal paths, defined as the shortest number of hops up the tree to reach a common ancestor and then back down, from each text node to every other text node in the group. Text nodes who's individual most frequently occurring traversal path is equal to the overall most frequently occurring traversal path of the entire group are considered to be part of the article's primary text while other text nodes are excluded. For example, in FIG. 7B, arrows are shown to represent three exemplary unique traversal paths from the first text node 703 in the group in level 716 to: group sibling text node 704, group sibling text node 705, and group sibling text node 706. The traversal path from text node 703 to group sibling text node 704 has 2 hops as represented by the hops to nodes 751 and 704. The traversal path from text node 703 to group sibling text node 705 has 10 hops as represented by the hops to nodes 751, 752, 753, 754, 755, 756, 757, 758, 759, and 705. The traversal path from text node 703 to group sibling text node 706 has 12 hops as represented by the hops to nodes 751, 752, 753, 754, 755, 701, 760, 761, 762, 763, 764, and 706. Although not shown, this computation is performed for each text node in the group in the level 716 (i.e., in box 702) to each of its sibling text nodes in the group in the level 716. All of the traversal paths from the first text node 703 to each of its siblings in the group in the level 716 are shown under text node 703, as indicated by reference arrow 770. For text node 703, a 2-hop traversal path occurs 1 time (i.e., frequency of 1), a 10-hop traversal path occurs 11 times (i.e., frequency of 11), and a 12 hop traversal path occurs 1 time (i.e., frequency of 1). The highest frequency traversal path for text node 703 is the 10-hop traversal path, as represented by the box 771. Similarly, the traversal paths and frequency are shown under each of text nodes in the group in the group in the level 716, with the highest frequency traversal path indicated by a box. The overall most frequently occurring traversal path of the entire group in the level 716 (i.e., in the box 702) is the 6-hop traversal path. Text nodes who's individual most frequently occurring traversal path is equal to 6-hops are considered to be part of the article's primary text while other text nodes are excluded, as represented by the dotted box 772. It is noted that in FIG. 7B, the bottom portion of the DOM structure below the box 702 is not shown in order to allow the traversal path information (number of hops and frequency) to be displayed under the text nodes in the box 702.

The article's primary text root node is computed by traversing up the DOM structure half the number of hops of the most frequently occurring traversal path. For example, within box 772, the most frequently occurring traversal path is 6-hops and half the hops is 3-hops. Thus, traversing up 3-hops from any of the text nodes in the group in the level 716 (e.g., text node 705) lead to node 757, which is the article's primary text node. The article's primary text node contains all the text nodes identified as being part of the article's primary text and is also used to further identify other nodes (both text and element) that may have been excluded by the earlier filtering processes. Examples include list, blockquote, or image elements that do not contain undesirable metadata (both global or publisher-specific), which may be considered part of the article's primary content because they are descendants of the article content root node.

At block 625, sections and subsection of the reading content are determined. Once the user device 101 determines that reading content exists on a web page 126 and the primary text determined, sections of the reading content can be determined. In one embodiment, the sections of the reading content can be determined based on text nodes of the DOM. For instance, a text node can correspond to a paragraph of the reading content. Subsections can also be determined, such as when a section is limited in granularity. For example, if a text node is limited in granularity to a paragraph, then lines within that paragraph can be determined to be subsections. In one embodiment, the operations for determining sections and subsections can be performed by the content identification module 103 of the reading behavior tracking module 102, such as described herein.

At block 630, the sections and subsections in the viewport 500 is tracked. Once the primary text is determined, the parts of the primary text that fall within the viewport 500 of the user device 101 can be tracked. For example, the specific sections and subsections that are displayed in viewport 500 can be identified and tracked in real-time. The viewport 500 corresponds to the viewing display 108 (or screen) on the user device 101 and thus can be used to track what text the user is reading. In one embodiment, the operations for tracking the viewport can be performed by the viewport tracking module 109 of the read state tracking module 104, such as described herein.

In order to accurately track a user's reading progress it is necessary to know which lines of text of an article are visible within the viewport 500 of the user device 101 at any given time. The user device 101 has a viewport 500 with a width and height measured in pixels. The article's HTML document also has a width and height measured in pixels and is likely to exceed the viewport's width and/or height. When the document's dimensions exceed that of the viewport 500, only a portion of the document is visible to the user at any given time. Certain dimensions (width and height) and coordinates (x and y offsets from origin) of the viewport 500, the document, and the document's elements are made available to developers via the DOM's API, but the positions of individual lines of text are not.

In order to determine the position of a line of text relative to the viewport 500, the document elements containing the article's primary text are identified and then stored as references along with certain statistics, which include the dimensions and coordinates of the element along with the number of words contained within the element's text nodes. The line height of the element is estimated by appending a span element containing a single character of text to the element and using the DOM API to measure the height of the span element. The line count of the element in question is determined by dividing the height of the element by the estimated line height. A series of virtual line elements representing each line of text is stored along with the element and its statistics. The number of words assigned to each virtual line is calculated by dividing the total number of words in the element by the number of lines and evenly distributing the result across the series of lines.

Stored along with each virtual line element is a read state array describing the number of read and unread words within that line as well as an offset measuring the distance in pixels from the top of the line to the top of its associated element as determined by the element's line height and the position of the virtual line within the series of the associated element's virtual lines. The virtual line's offset from its associated element combined with the associated element's position as provided by the DOM API allows for the determination as to whether or not the virtual line is visible within the user's viewport 500 at any given time and whether any of its words should be counted as having being read.

A counter is initiated and used to generate read states for the reading content in the viewport 500. The counter counts at a predetermined rate and tracks the number of words that are read in the viewport. The predetermined rate can be used to approximate the reading speed of users. For example, the base unit of 1 count can refer to one word of text. In one embodiment, the predetermined rate can be between 180 and 190 words per minute. The predetermined rate can vary in different embodiments and is not limited to the example range provided. In one embodiment, the counter can be applied starting with the most upper-left word that is unread in the viewport 500. The count can be applied on a subsection (e.g., virtual line) basis thereafter, counting through the unread words of each subsection, beginning with the most upper-left subsection in the viewport 500. In one embodiment, the operations for the counter can be performed by the counter module 110 of the read state tracking module 104, such as described herein.

At block 635, read states are generated for sections and subsections in the viewport 500. A read state can be generated for the content in the viewport 500 based on the counter. The read state can be generated for each subsection (e.g., each line or virtual line). Read states for sections and for the reading content as a whole can also be determined. The read states can be stored in the memory 106 on the user device 101 and can also be transmitted to the server 120 for storage within the database 125 and associated with the user profile. The read state can be an array of values (or set of values) representing read and unread words the corresponding subsection, section, or entire reading content. For example, the array of [5, −15] can be used to represent a virtual line having 20 words total, with the first 5 indicated as read and the last 15 indicated as unread. The read states can be generated in real-time. In another embodiment, the read states can be generate at a predetermined interval of time, such as every second, 2 seconds, 5 seconds, or any other predetermined interval of time. The read states can also be generated when specific events occur, such as when a subsection exits the viewport, for instance. In such case, for example, the read state for the exiting subsection will be generated. The read state can also be generated when the user exits the web page hosting the reading content. The read states can be saved in the memory 106 on the user device 101 and used to preserve the read states of the subsections and sections of the reading content. For example, when an exiting subsection returns within the viewpoint 500, then the corresponding read state of the subsection can be retrieved. The read state can similarly apply when a user exits an article and returns at a later time. For example, if a user only reads various portions (e.g., subsection and sections) of a particular reading content, then the read states can be saved and used at a future point in time when the user continues reading the reading content. In one embodiment, the operations for the read state generation can be performed by the read state generation module 111 of the read state tracking module 104, such as described herein.

A summation read state is a read state that is generated from more than one read state, which were generated for content displayed within the viewport 500. For example, summation read states can be generated from adding read states from multiple subsections, multiple sections, or the reading content as a whole. The summation read state can be an array of values (or set of values) representing read and unread words. In another embodiment, the summation can be represented as a percentage value in addition to or in place of the array. In one embodiment, the operations for generating a summation read state can be performed by the summation generation module 112 of the read state tracking module 104, such as described herein. In an embodiment, the summation read states can be saved in the memory 106 on the user device 101.

At block 640, read states (e.g., summation read states) can be sent to the server 120 from the user device 101. In one embodiment, the summation read states can be sent in real-time. In another embodiment, the summation read states can be sent at predetermined intervals of time, such as every second, 2 seconds, 5 seconds, or any other predetermined interval of time. The summation read states can also be sent to the server 120 upon the occurrence of a predetermined event, such as when the user leaves a web page having the reading content, or when the user opens another application or web browser. In one embodiment, a summation read state for the entire reading content is sent to the server 120. In one embodiment, the only read states sent to the server 120 are summation read states. In another embodiment, other read states (e.g., for virtual lines) are sent to the server 120 in addition to the summation read states.

In one embodiment, the operations for sending the summation read states can be performed by the communication module 105 of the reading behavior tracking module 102, such as described herein. The server 120 receives the summation read states from the user device 101. The read states can be sent to the server 120 along with identifying information about the reading content, such as the title of the content, the author or publisher of the content, the date the content was published, etc. The user device can obtain the identifying information from the web page. In one embodiment, the operations for receiving the summation read states can be performed by the communication module 124 of the user behavior tracking module 121, such as described herein.

At block 645, the read states and any identifying information are stored for the reading content and associated user profile for the user. For example, on the server 120 side, read states (and the summation read states) can be stored in records maintained in the database 125 for the applicable reading content and user profile for the user. The database 125 can include various data, such as user profile information, user authentication data (e.g., logins, passwords, etc.), read states for various content and associated user profiles, etc. For example, the database 125 can maintain records (or tables) of all the reading content that each user has accessed and the corresponding read states. The database 125 can store information identifying the reading content instead of the actual text of the reading content. Information identifying the reading content can include, for example, the title of the content, the author or publisher of the content, the date the content was published, etc. The identifying information can be obtained from the DOM of the web page by the user device 101, for instance, and sent to the server 120 along with the read states. In one embodiment, the server 120 does not host any of the reading content on any of the web pages 126, or save the actual text (e.g., the primary text) of any reading content in the database 125 or elsewhere on the server 120. In another embodiment, the server 120 hosts some or all of the reading content on the web pages 126 or saves the actual text of the reading content in the database 125. In one embodiment, the operations for storing the summation read states can be performed by the record tracking module 122, such as described herein.

At block 650, user privileges for the reading content are set (e.g., enabled) based on the user's read states (e.g., summation read state) for the reading content. The records can be maintained in the database 125, and can include information for user profiles, user privileges, users' read states (including summation read states) for various reading content that the users have accessed, etc. In another embodiment, the records can be stored in a remotely located database. The records can include user privileges status, such as whether user can comment on the article, share the article, like the article, rate the article, etc. The user privileges can be dependent on the read state of a user and whether it is determined that the user sufficiently read the article corresponding to the read state. For instance, a user can gain user privileges with respect to a particular reading content if the reading state of the user for that particular reading content exceeds a predetermined threshold. A read state can include, for example, an array of values (or a set of values) with each value representing a number of read and unread words associated with the content. The read state can be stored in the database 125 and used to determine a percentage value for the amount of the reading content that has been read. In one embodiment, the operations for maintaining the records as described in this paragraph can be performed by the record tracking module 122 of the user behavior tracking module 121, such as described herein.

A determination as to whether the user "read" the article (or sufficiently read the article) can be made based on the summation read states, which can then be used to set user privileges accordingly. For example, the most recent summation read state for the entire reading content can be used to calculate a percentage of the reading content that has been read. In one embodiment, a predetermined threshold percentage value can be set to indicate when reading content is considered "read" (or sufficiently read) a user. For example, the percentage threshold value can be set at 85%, 90%, 95%, 100%, or any other predetermined threshold percentage value. A "reading status" can be determined (e.g., calculated) to indicate how much of the reading content is considered "read" by the user. The reading status can be stored in the records for the particular user and associated reading content. In one embodiment, the operations for determining the reading status can be performed by the read decision module 127 of the record tracking module 122, such as described herein.

Based on the reading status of a user for a particular reading content, one or more user privileges can be enabled with respect to the reading content. For example, if it is determined that a user has "read" an article, then one or more user privileges can be enabled for the user with respect to the article. The status of user privileges (i.e., enabled or disabled) can be stored and updated accordingly in the records in the database 125.

Once a user privilege is enabled for the user with respect to the corresponding article, the server 120 can render the web page with the user privilege enabled. In one embodiment, the operations for determining the statuses (e.g., enabled or disabled) of user privileges can be performed by the user privilege module 123 of the user behavior tracking module 121, such as described herein.

At block 655, user-specific data is integrated within the customized web page 126 and provided for display on the user device for the user. The user-specific data can include user privileges (e.g., enabled user privileges), metrics, and other data specific to the user and one or more reading content. For example, the server 120 can generate various metrics based on the records for the user and the various reading content. Example metrics about individual users can include how often a user finishes reading articles versus skimming or scanning the article; how many articles a user reads per given time period; what types of articles (e.g., sports, foreign affairs, health, etc.) the user usually reads completely and does not read completely, etc. The read states can be utilized to give a high resolution view of how the user interacts with reading content, such as whether they read the entire content, only read the beginning of content, skim the content, etc. This can also indicate the varying interest levels of different content based on how much of the article was read.

Data for a collection of users can be integrated within the customized web page 126. The data for a collection of users are based on the users reading states and can include metrics for the collection of users. The metrics can give similar high resolution view of how the collection of users interact with the reading content. The metrics can include, for example, how many users have read an article, how many users stopped reading an article before finishing, etc. The metrics can be integrated within the web pages 126 provided to the users. For example, the titles of reading content can be listed on the web pages 126 to the users based on popularity, which can be based on the tracking techniques taught herein to determine whether users have read the article. For example, the popularity of an article can be based on the total number of users to have read the article (or the total number of reads an article has), the total number of comments an article has, the total number of likes, the combined ratings score of users, etc.), or other trending activity (e.g., the articles with the most recent flood of activity based on whether users have read the article), etc. In another embodiment, the list of articles can also be ranked based on factors that are not necessarily based on the tracking techniques taught herein, such as date of the article, length of the article, etc.

Metrics and other data for a collection of users, or individual user, can be processed to generate assumptions (or conclusions) about user preferences. For example, the metrics and data can be analyzed to identify a wide range of characteristics or patterns, such as preferences for various types of content, dislike for certain content, user interests, user expertise, etc. These metrics can provide value to users and can even help people improve their reading skills.

The server 120 can generate web pages 126 based on user-specific metrics so that each user receives customized web pages 126, such as shown in the exemplary web pages 126a and 126b. For example, the titles of reading content can be displayed along with the user's reading status for the reading content (e.g., as a percentage value). The article itself can be stored in the database 125. In one embodiment, the web pages 126 display the titles of the reading content and hyperlinks to the entire reading content for the user to view on web pages 122 hosted on one or more external systems 161. In another embodiment, the entire reading content for the user to view can be provided on one or more of the web pages 126 on the server 120. In one embodiment, the operations for generating the various metrics and displaying the customized web pages 126 can be performed by the output generation module 128 of the user behavior tracking module 121, such as described herein. It should be appreciated that the techniques provided herein can be performed in real time simultaneously for multiple users using different user devices 101.

In one embodiment, the primary text of the article is not sent to the server 120. This can be avoided for various reasons, such as reducing the amount of data to send to the server 120. Instead, the user device 101 sends various information related to reading content to the server 120. This can include information such as the title, author, publisher, date of publication, generated read states (including summation read states), etc.

In another embodiment, the primary text of one or more reading content can be sent from the user device 101 to the server 120. If the server 120 hosts reading content on its web pages 126, then the server 120 can search to see if a record already exists for the primary text of the reading content. When a user discovers an article that has not been stored as a record in the server 120, the server 120 can generate and save a record for the primary text of the article. This primary text can be used, for example, to compare copies or reposts of the same article on different websites, and treating all those copies as the same reading content. In one embodiment, the operations for searching for a record, as well as generating and storing records, can be performed by the record tracking module 122 of the user behavior tracking module 121, such as described herein.

Figure 8:
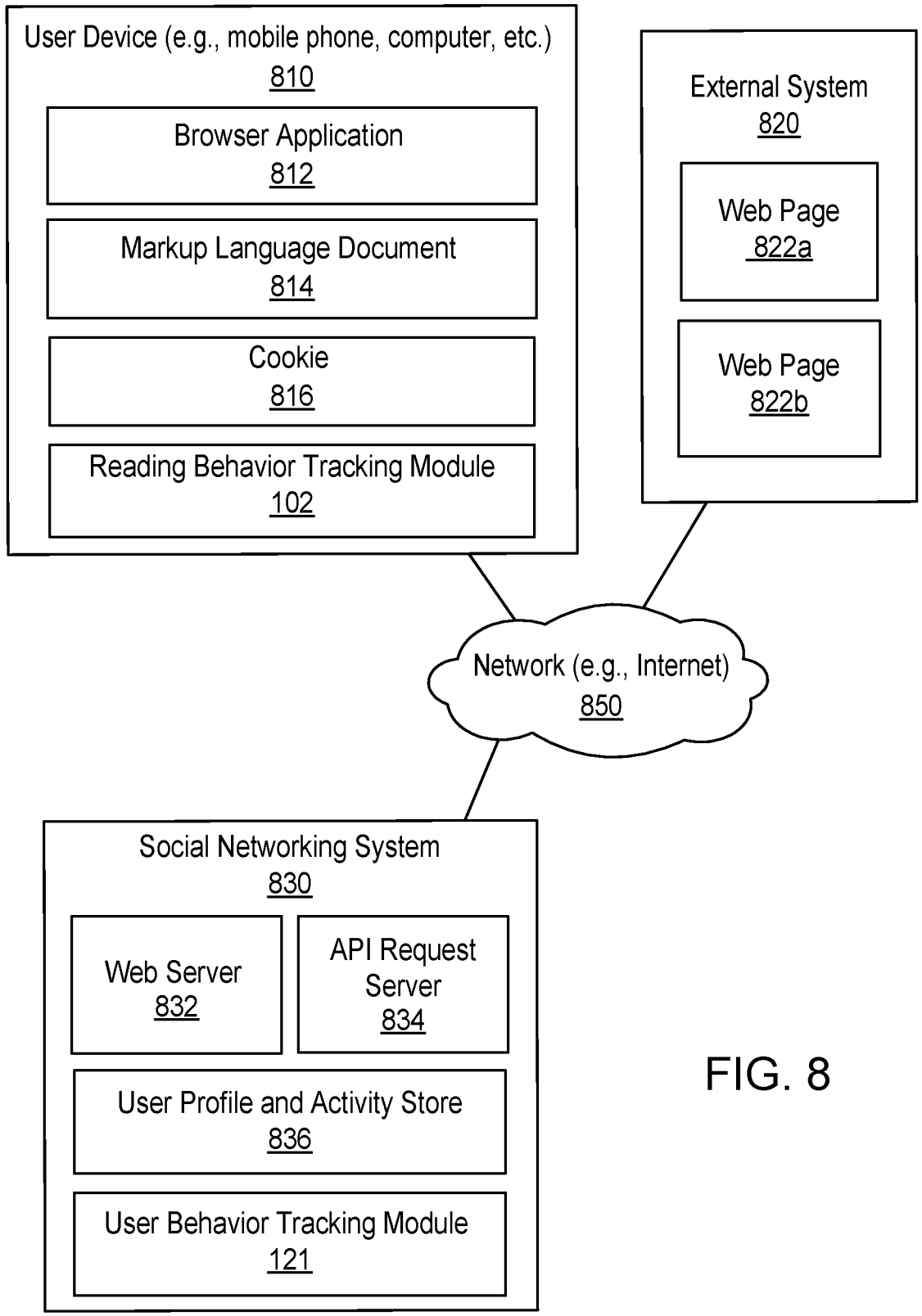
FIG. 8 illustrates a network diagram of an example system for tracking digital reading behavior of users, according to an embodiment.

In certain aspects, the techniques disclosed herein may be applicable to a social networking system. FIG. 8 illustrates a network diagram of an example system 800 for tracking digital reading behavior of users, in accordance with an embodiment. The system 800 includes one or more user devices 810, one or more external systems 820, a social networking system 830, and a network 850. In an embodiment, the read tracking system 100 of FIG. 1 discussed herein may be implemented within the social networking system 830. In this way, the read tracking system 800 can track users digital reading behavior with respect to reading content either on, or otherwise accessible to (e.g., external web page of external system 820), the social networking system 830, as described herein. The techniques taught herein for the features and function of the read tracking system 100 of FIG. 1 can be apply to the read tracking system 800 of FIG. 8. For example, the techniques taught herein for the features and functions of user device 101, the server 120, and external system 160, can be applicable to the user device 810, the social networking system 830, and the external systems 820. For the sake of clarity and brevity, not all similar features and functions are repeated here for FIG. 8.

For purposes of illustration, the embodiment of the system 800, shown by FIG. 8, includes a single external system 820 and a single user device 810. However, in other embodiments, the system 800 may include more user devices 810 and/or more external systems 820. In certain embodiments, the social networking system 830 is operated by a social network provider, whereas the external systems 820 are separate from the social networking system 830 in that they may be operated by different entities. In various embodiments, however, the social networking system 830 and the external systems 820 operate in conjunction to provide social networking services to users (or members) of the social networking system 830. In this sense, the social networking system 830 provides a platform or backbone, which other systems, such as external systems 820, may use to provide social networking services and functionalities to users across the Internet.

The user device 810 comprises one or more computing devices that can receive input from a user and transmit and receive data via the network 850. In one embodiment, the user device 810 is a conventional computer system executing, for example, a Microsoft Windows compatible operating system (OS), Apple OS X, and/or a Linux distribution. In another embodiment, the user device 810 can be a device having computer functionality, such as a smart-phone, a tablet, a personal digital assistant (PDA), a mobile telephone, etc. The user device 810 is configured to communicate via the network 850. The user device 810 can execute an application, for example, a browser application that allows a user of the user device 810 to interact with the social networking system 830. In another embodiment, the user device 810 interacts with the social networking system 830 through an application programming interface (API) provided by the native operating system of the user device 810, such as iOS and ANDROID. The user device 810 is configured to communicate with the external system 820 and the social networking system 830 via the network 850, which may comprise any combination of local area and/or wide area networks, using wired and/or wireless communication systems.

In one embodiment, the network 850 uses standard communications technologies and protocols. Thus, the network 850 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 850 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 850 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 810 may display content from the external system 820 and/or from the social networking system 830 by processing a markup language document 814 received from the external system 820 and from the social networking system 830 using a browser application 812. The markup language document 814 identifies content and one or more instructions describing formatting or presentation of the content. By executing the instructions included in the markup language document 814, the browser application 812 displays the identified content using the format or presentation described by the markup language document 814. For example, the markup language document 814 includes instructions for generating and displaying a web page having multiple frames that include text and/or image data retrieved from the external system 820 and the social networking system 830. In various embodiments, the markup language document 814 comprises a data file including extensible markup language (XML) data, extensible hypertext markup language (XHTML) data, or other markup language data. Additionally, the markup language document 814 may include JavaScript Object Notation (JSON) data, JSON with padding (JSONP), and JavaScript data to facilitate data-interchange between the external system 820 and the user device 810. The browser application 812 on the user device 810 may use a JavaScript compiler to decode the markup language document 814. The markup language document 814 may also include, or link to, applications or application frameworks such as FLASH™ or Unity™ applications, the SilverLight™ application framework, etc.

In one embodiment, the user device 810 also includes one or more cookies 816 including data indicating whether a user of the user device 810 is logged into the social networking system 830, which may enable modification of the data communicated from the social networking system 830 to the user device 810.

The user device 810 also includes the reading behavior tracking module 102, such as described herein, that enables the tracking of digital reading behavior of users on the user device 810.

The external system 820 includes one or more web servers that include one or more web pages 822a, 822b, which are communicated to the user device 810 using the network 850. The external system 820 is separate from the social networking system 830. For example, the external system 820 is associated with a first domain, while the social networking system 830 is associated with a separate social networking domain. Web pages 822a, 822b, included in the external system 820, comprise markup language documents 814 identifying content and including instructions specifying formatting or presentation of the identified content.

The social networking system 830 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 830 may be administered, managed, or controlled by an operator.

Users may join the social networking system 830 and then add connections to any number of other users of the social networking system 830 to whom they desire to be connected. As used herein, the term "friend" refers to any other user of the social networking system 830 to whom a user has formed a connection, association, or relationship via the social networking system 830.

The social networking system 830 is also capable of linking a variety of entities. For example, the social networking system 830 enables users to interact with each other as well as external systems 820 or other entities through an API, a web service, or other communication channels. The social networking system 830 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 830. In one embodiment, the read tracking system 800 can track users reading behavior on one or more nodes.

The social networking system 830 also includes user-generated content, which enhances a user's interactions with the social networking system 830. In one embodiment, the read tracking system 800 can track users reading behavior with respect to the user-generated content. User-generated content may include anything a user can add, upload, send, or "post" to the social networking system 830. For example, a user communicates posts to the social networking system 830 from a user device 810. Posts may include data such as status updates or other textual data, location information, images such as photos, videos, links, music or other similar data and/or media. Content may also be added to the social networking system 830 by a third party. Content "items" are represented as objects in the social networking system 830. In this way, users of the social networking system 830 are encouraged to communicate with each other by posting text and content items of various types of media through various communication channels. Such communication increases the interaction of users with each other and increases the frequency with which users interact with the social networking system 830.

The social networking system 830 includes a web server 832, an API request server 834, a user profile and activity store 836, and the user behavior tracking module 121. In an embodiment of the invention, the social networking system 830 may include additional, fewer, or different components for various applications. Other components, such as network interfaces, security mechanisms, load balancers, failover servers, management and network operations consoles, and the like are not shown so as to not obscure the details of the system.

The user profile and activity store 836 maintains information about user accounts and data describing one or more connections between different users and with other nodes in the social networking system 830, such as non-person entities, buckets, cluster centers, images, interests, pages, external systems, concepts, and the like. The social networking system 830 maintains data about objects with which a user may interact. To maintain this data, the user profile and activity store 836 stores instances of the corresponding type of objects maintained by the social networking system 830. Each object type has information fields that are suitable for storing information appropriate to the type of object. For example, the user profile and activity store 836 contains data structures with fields suitable for describing a user's account and information related to a user's account. Data structures may also be suitable for describing a user's connections to other users, connections to external systems 820, or connections to other entities. The user profile and activity store 836 can also track user activity (e.g., in an activity log) on and off the social networking system 830, which enables the social networking system 830 to generate the social graph that uses nodes to identify various objects and edges connecting nodes to identify relationships between different objects. The user profile and activity store 836 can also manage authentication features within the social networking system, such as enforcing one or more privacy settings and managing access of users to various objects, users, or other information within the social networking system 830.

The web server 832 links the social networking system 830 to one or more user devices 810 and/or one or more external systems 820 via the network 850. The web server 832 serves web pages, as well as other web-related content, such as Java, JavaScript, Flash, XML, and so forth. The web server 832 may include a mail server or other messaging functionality for receiving and routing messages between the social networking system 830 and one or more user devices 810. The messages can be instant messages, queued messages (e.g., email), text and SMS messages, or any other suitable messaging format.

The API request server 834 allows one or more external systems 820 and user devices 810 to call access information from the social networking system 830 by calling one or more API functions. The API request server 834 may also allow external systems 820 to send information to the social networking system 830 by calling APIs. The external system 820, in one embodiment, sends an API request to the social networking system 830 via the network 850, and the API request server 834 receives the API request. The API request server 834 processes the request by calling an API associated with the API request to generate an appropriate response, which the API request server 834 communicates to the external system 820 via the network 850. For example, responsive to an API request, the API request server 834 collects data associated with a user, such as the user's connections that have logged into the external system 820, and communicates the collected data to the external system 820. In another embodiment, the user device 810 communicates with the social networking system 830 via APIs in the same manner as external systems 820.

Hardware Implementation

Figure 9:
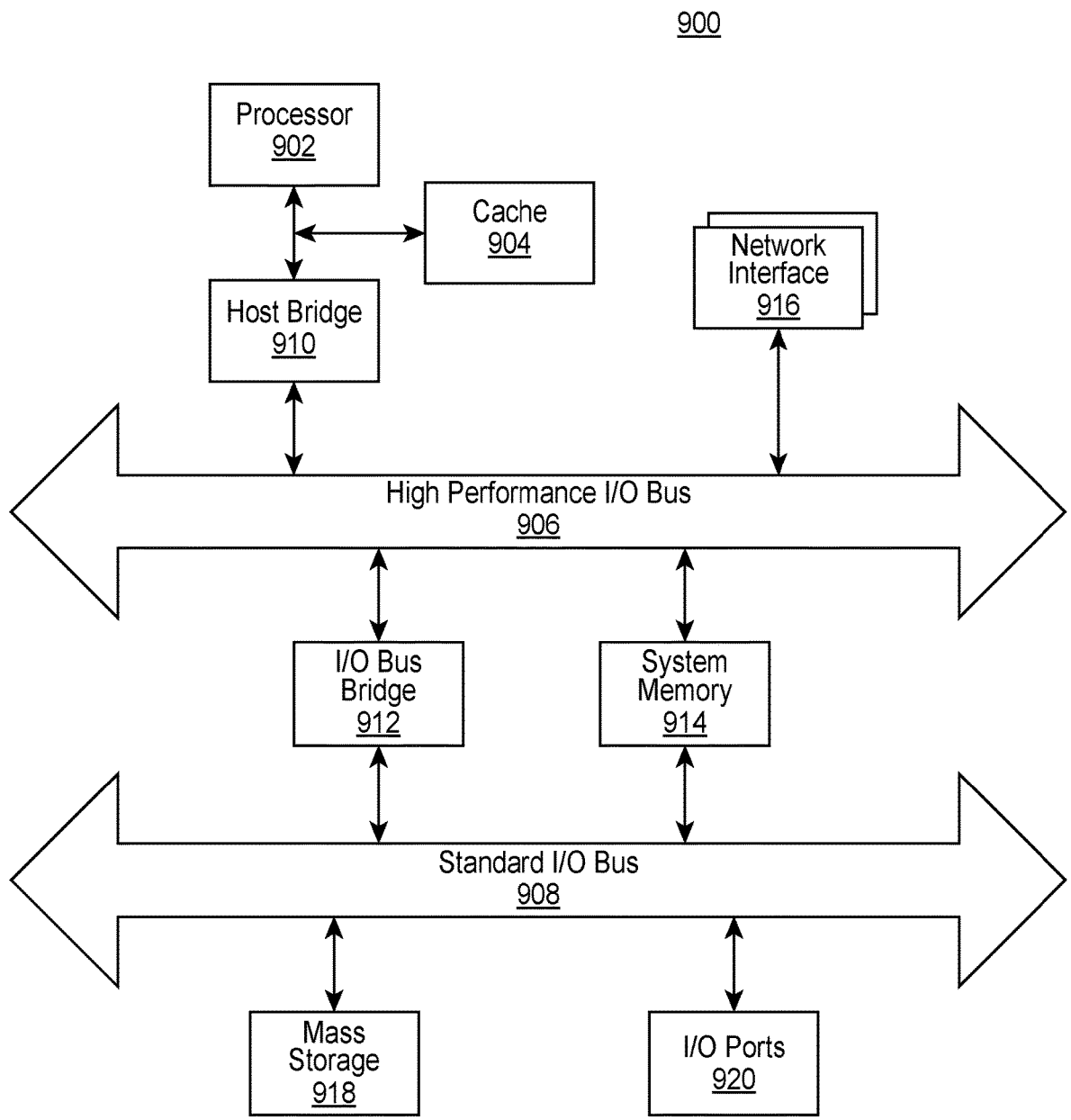
FIG. 9 illustrates a block diagram of an example computer system, according to an embodiment.

The foregoing processes and features can be implemented by a wide variety of machine and computer system architectures and in a wide variety of network and computing environments. FIG. 9 illustrates an example of a computer system 900 that may be used to implement one or more of the embodiments described herein in accordance with an embodiment of the invention. The computer system 900 includes sets of instructions for causing the computer system 900 to perform the processes and features discussed herein. The computer system 900 may be connected (e.g., networked) to other machines. In a networked deployment, the computer system 900 may operate in the capacity of a server machine or a client machine in a client-server network environment, or as a peer machine in a peer-to-peer (or distributed) network environment. In an embodiment, the computer system 900 may be implemented as the user devices of FIGS. 1 and 8, the external systems of FIGS. 1 and 8, the social networking system of FIG. 8, or a component thereof. In an embodiment, the computer system 900 may be one server among many that constitutes all or part of the social networking system 830.

The computer system 900 includes a processor 902, a cache 904, and one or more executable modules and drivers, stored on a computer-readable medium, directed to the processes and features described herein. Additionally, the computer system 900 includes a high performance input/output (I/O) bus 906 and a standard I/O bus 908. A host bridge 910 couples processor 902 to high performance I/O bus 906, whereas I/O bus bridge 912 couples the two buses 906 and 908 to each other. A system memory 914 and one or more network interfaces 916 couple to high performance I/O bus 906. The computer system 900 may further include video memory and a display device coupled to the video memory (not shown). Mass storage 918 and I/O ports 920 couple to the standard I/O bus 908. The computer system 900 may optionally include a keyboard and pointing device, a display device, or other input/output devices (not shown) coupled to the standard I/O bus 908. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 900, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 900 are described in greater detail below. In particular, the network interface 916 provides communication between the computer system 900 and any of a wide range of networks, such as an Ethernet (e.g., IEEE 802.3) network, a backplane, etc. The mass storage 918 provides permanent storage for the data and programming instructions to perform the above-described processes and features implemented by the respective computing systems identified above, whereas the system memory 914 (e.g., DRAM) provides temporary storage for the data and programming instructions when executed by the processor 902. The I/O ports 920 may be one or more serial and/or parallel communication ports that provide communication between additional peripheral devices, which may be coupled to the computer system 900.

The computer system 900 may include a variety of system architectures, and various components of the computer system 900 may be rearranged. For example, the cache 904 may be on-chip with processor 902. Alternatively, the cache 904 and the processor 902 may be packed together as a "processor module", with processor 902 being referred to as the "processor core". Furthermore, certain embodiments of the invention may neither require nor include all of the above components. For example, peripheral devices coupled to the standard I/O bus 908 may couple to the high performance I/O bus 906. In addition, in some embodiments, only a single bus may exist, with the components of the computer system 900 being coupled to the single bus. Furthermore, the computer system 900 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 900 that, when read and executed by one or more processors, cause the computer system 900 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 900, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 902. Initially, the series of instructions may be stored on a storage device, such as the mass storage 918. However, the series of instructions can be stored on any suitable computer readable storage medium. Furthermore, the series of instructions need not be stored locally, and could be received from a remote storage device, such as a server on a network, via the network interface 916. The instructions are copied from the storage device, such as the mass storage 918, into the system memory 914 and then accessed and executed by the processor 902. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 900 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computer system, one or more read states related to a reading content from a user device, wherein the one or more read states related to the reading content comprises an array of values representing numbers of read and unread words for the reading content that is viewed on the user device by a user, and wherein the one or more read states related to a reading content are derived from:
        receiving an indication that the user accessed a web page with the user device;
        scanning the web page to determine that the web page includes the reading content for users to read;
        analyzing a DOM structure of the web page to identify a primary text of the reading content;
        calculating a position for each of a plurality of virtual lines for the primary text relative to a viewport of the user device;
        calculating a number of words assigned to each of the plurality of virtual lines;
        tracking which virtual lines of the plurality of virtual lines are displayed within the viewport of the user device;
        initiating a counter for the virtual lines displayed within the viewport of the user device; and
        generating read states for each of the virtual lines displayed within the viewport, wherein the read states for each of the virtual lines displayed within the viewport are based on:
            a duration of time that each of the virtual lines displayed within the viewport remains in the viewport, wherein the duration of time is determined by the counter; and
            the number of words assigned to each of the virtual lines displayed within the viewport;
    determining, by the computer system, a reading status of the user with respect to the reading content, wherein the reading status is determined based on the one or more read states related to the reading content;
    determining, by the computer system, that the user has read at least a predetermined threshold amount of the reading content based on the determined reading status;
    enabling, by the computer system, one or more user privileges related to the reading content for the user as a result of the determination that the user has read at least the predetermined threshold amount; and
    transmitting, by the computer system, user-specific data integrated within one or more web pages for display on the user device for the user, wherein the user-specific data comprises the enabled one or more user privileges for the user.

2. The computer-implemented method of claim 1, wherein the one or more read states related to the reading content comprises one or more summation read states, and wherein the reading status is determined based on the one or more summation read states.

3. The computer-implemented method of claim 2, wherein the one or more summation read states are arrays of alternating signed non-zero integers representing alternating numbers of read words and unread words.

4. The computer-implemented method of claim 1, further comprising transmitting, by the computer system, data for a collection of users integrated within the one or more web pages for display on the user device for the user, wherein the data for the collection of users comprises a popularity ranking of a plurality of reading content, and wherein the popularity of each of the reading content in the plurality of reading content is based on a number of users of the collection that have read at least a predetermined threshold amount.

5. The computer-implemented method of claim 4, wherein the one or more read states related to the reading content comprises one or more summation read states, wherein the reading status is determined based on the one or more summation read states, and wherein the one or more summation read states are arrays of alternating signed non-zero integers representing alternating numbers of read words and unread words.

6. The computer-implemented method of claim 5, wherein the one or more user privileges comprises commenting on the reading comment, and wherein the predetermined threshold amount is 100% of the reading content.

7. The computer-implemented method of claim 1, wherein the predetermined threshold amount is 100% of the reading content.

8. The computer-implemented method of claim 1, wherein the one or more user privileges comprises commenting on the reading comment.

9. The computer-implemented of claim 1, wherein the one or more read states related to the reading content comprises the read states for the virtual lines displayed within the viewport.

10. A system comprising:
    a server comprising:
        at least one first processor; and
        a first memory storing first instructions that, when executed by the at least one first processor, cause the server to perform:
            receiving one or more read states related to a reading content from a user device, wherein the one or more read states related to the reading content comprise an array of values representing numbers of read and unread words for the reading content that is viewed on the user device by a user;
            determining a reading status of the user with respect to the reading content, wherein the reading status is determined based on the one or more read states related to the reading content;
            determining that the user has read at least a predetermined threshold amount of the reading content based on the determined reading status; and
            enabling one or more user privileges related to the reading content for the user as a result of the determination that the user has read at least the predetermined threshold amount; and
            transmitting user-specific data integrated within one or more first web pages for display on the user device for the user, wherein the user-specific data comprises the enabled one or more user privileges for the user;
    the user device communicatively coupled to the server, the user device comprising:
        at least one second processor; and
        a second memory storing second instructions that, when executed by the at least one second processor, cause the user device to perform:
            receiving an indication that the user accessed a second web page with the user device;

scanning the second web page to determine that the second web page includes the reading content for users to read;
analyzing a DOM structure of the second web page to identify the primary text of the reading content;
calculating a position for each of a plurality of virtual lines for the primary text relative to a viewport of the user device;
calculating a number of words assigned to each of the plurality of virtual lines;
tracking which virtual lines of the plurality of virtual lines are displayed within the viewport of the user device;
initiating a counter for the virtual lines displayed within the viewport of the user device; and
generating read states for each of the virtual lines displayed within the viewport, wherein the read states are based on:
a duration of time that each of the virtual lines displayed within the viewport remains in the viewport, wherein the duration of time is determined by the counter; and
the number of words assigned to each of the virtual lines displayed within the viewport.

11. The system of claim 10, wherein the one or more read states related to the reading content comprises one or more summation read states, and wherein the reading status is determined based on the one or more summation read states.

12. The system of claim 11, wherein the one or more summation read states are arrays of alternating signed non-zero integers representing alternating numbers of read words and unread words.

13. The system of claim 10, wherein the first instructions cause the server to further perform transmitting data for a collection of users integrated within the one or more first web pages for display on the user device for the user, wherein the data for the collection of users comprises a popularity ranking of a plurality of reading content, wherein the popularity of each of the reading content in the plurality of reading content is based on a number of users of the collection that have read at least a predetermined threshold amount.

14. The system of claim 13, wherein the one or more read states related to the reading content comprises one or more summation read states, wherein the reading status is determined based on the one or more summation read states, and wherein the one or more summation read states are arrays of alternating signed non-zero integers representing alternating numbers of read words and unread words.

15. The system of claim 14, wherein the one or more user privileges comprises commenting on the reading comment, and wherein the predetermined threshold amount is 100% of the reading content.

16. The system of claim 10, wherein the predetermined threshold amount is 100% of the reading content.

17. The system of claim 10, wherein the one or more user privileges comprises commenting on the reading comment.

18. A non-transitory computer-readable storage medium storing computer-executable instructions that, when executed, cause a computer system to perform a computer-implemented method comprising:
receiving one or more read states related to a reading content from a user device, wherein the one or more read states related to the reading content comprise an array of values representing numbers of read and unread words for the reading content that is viewed on the user device by a user, and wherein the one or more read states related to the reading content are derived from:
receiving an indication that the user accessed a web page with the user device;
scanning the web page to determine that the web page includes the reading content for users to read;
analyzing a DOM structure of the web page to identify a primary text of the reading content;
calculating a position for each of a plurality of virtual lines for the primary text relative to a viewport of the user device;
calculating a number of words assigned to each of the plurality of virtual lines;
tracking which virtual lines of the plurality of virtual lines are displayed within the viewport of the user device;
initiating a counter for the virtual lines displayed within the viewport of the user device; and
generating read states for each of the virtual lines displayed within the viewport, wherein the read states for each of the virtual lines displayed within the viewport are based on:
a duration of time that each of the virtual lines displayed within the viewport remains in the viewport, wherein the duration of time is determined by the counter; and
the number of words assigned to each of the virtual lines displayed within the viewport;
determining a reading status of the user with respect to the reading content, wherein the reading status is determined based on the one or more read states related to the reading content;
determining that the user has read at least a predetermined threshold amount of the reading content based on the determined reading status;
enabling one or more user privileges related to the reading content for the user as a result of the determination that the user has read at least the predetermined threshold amount; and
transmitting user-specific data integrated within one or more web pages for display on the user device for the user, wherein the user-specific data comprises the enabled one or more user privileges for the user.

19. The non-transitory computer-readable storage medium of claim 18, wherein the one or more read states related to the reading content comprises one or more summation read states, and wherein the reading status is determined based on the one or more summation read states.

20. The non-transitory computer-readable storage medium of claim 19, wherein the one or more summation read states are arrays of alternating signed non-zero integers representing alternating numbers of read words and unread words.

21. The non-transitory computer-readable storage medium of claim 18, wherein the computer-implemented method further comprises transmitting data for a collection of users integrated within the one or more web pages for display on the user device for the user, wherein the data for the collection of users comprises a popularity ranking of a plurality of reading content, wherein the popularity of each of the reading content in the plurality of reading content is based on a number of users of the collection that have read at least a predetermined threshold amount.

22. The non-transitory computer-readable storage medium of claim 21, wherein the one or more read states related to the reading content comprises one or more summation read states, wherein the reading status is determined based on the one or more summation read states, and wherein the one or more summation read states are arrays of alternating signed non-zero integers representing alternating numbers of read words and unread words.

23. The non-transitory computer-readable storage medium of claim 22, wherein the one or more user privileges comprises commenting on the reading comment, and wherein the predetermined threshold amount is 100% of the reading content.

24. The non-transitory computer-readable storage medium of claim 18, wherein the predetermined threshold amount is 100% of the reading content.

25. The non-transitory computer-readable storage medium of claim 18, wherein the one or more user privileges comprises commenting on the reading comment.

\* \* \* \* \*